United States Patent
Maeda

(10) Patent No.: US 10,324,454 B2
(45) Date of Patent: Jun. 18, 2019

(54) INFORMATION PROCESSING APPARATUS, MODELING SYSTEM, AND INFORMATION PROCESSING METHOD

(71) Applicant: Hiroshi Maeda, Kanagawa (JP)

(72) Inventor: Hiroshi Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 15/452,858

(22) Filed: Mar. 8, 2017

(65) Prior Publication Data

US 2017/0266884 A1 Sep. 21, 2017

(30) Foreign Application Priority Data

Mar. 17, 2016 (JP) .................... 2016-054455

(51) Int. Cl.
*G05B 19/4099* (2006.01)
*H04N 1/409* (2006.01)
(Continued)

(52) U.S. Cl.
CPC ........ *G05B 19/4099* (2013.01); *B29C 64/106* (2017.08); *B29C 64/386* (2017.08); *H04N 1/4092* (2013.01); *B33Y 30/00* (2014.12); *B33Y 50/02* (2014.12); *G05B 2219/49023* (2013.01); *Y02P 80/40* (2015.11)

(58) Field of Classification Search
None
See application file for complete search history.

(56) References Cited

U.S. PATENT DOCUMENTS

| 6,113,696 A | 9/2000 | Tseng | |
|---|---|---|---|
| 2007/0179657 A1* | 8/2007 | Holzwarth | B33Y 50/02 700/119 |
| 2017/0052531 A1* | 2/2017 | Minardi | G05B 15/02 |

FOREIGN PATENT DOCUMENTS

| EP | 2017833 | 1/2009 |
|---|---|---|
| JP | H05-193008 | 8/1993 |

(Continued)

OTHER PUBLICATIONS

Brooks H et al: "Research towards high speed extrusion freeforming", International Journal of Rapid Manufacturing : IJRA, Inderscience Enterprises, Ch, vol. 3, No. 2-3, Jan. 1, 2013, pp. 154-171.

(Continued)

*Primary Examiner* — Kenneth M Lo
*Assistant Examiner* — Istiaque Ahmed
(74) *Attorney, Agent, or Firm* — IPUSA, PLLC

(57) ABSTRACT

An information processing apparatus is configured to provide an additive manufacturing apparatus with data for creating a modeling object. The additive manufacturing apparatus includes a layering part configured to layer a material and move in accordance with trajectory information to create the modeling object. The information processing apparatus includes a memory and a processor coupled to the memory. The processor is configured to create a cross-sectional shape of the modeling object using data on the shape of the modeling object, create the trajectory information based on the created cross-sectional shape, and create width information to dynamically vary the width of the material to be layered based on the trajectory information.

9 Claims, 18 Drawing Sheets

(51) Int. Cl.
*B29C 64/386* (2017.01)
*B29C 64/106* (2017.01)
*B33Y 30/00* (2015.01)
*B33Y 50/02* (2015.01)

(56) References Cited

FOREIGN PATENT DOCUMENTS

| | | |
|---|---|---|
| JP | 2001-301045 | 10/2001 |
| JP | 2015-217538 | 12/2015 |

OTHER PUBLICATIONS

Brooks H et al: "Variable Fused Deposition Modelling—analysis of benefits, concept design and tool path generation", 5th International Conference on Advanced Research in Virtual and Physical Prototyping, 2011, pp. 511-517.
Cao Yi et al: "Using variable beam spot scanning to improve the efficiency of stereolithography process", Rapid Prototyping Journal, vol. 19, No. 2, Mar. 1, 2013, pp. 100-110.
Li Yuanrui et al: "Stereolithography with variable resolutions using optical filter with high-contrast gratings", Journal of Vacuum Science & Technology B: Microelectronics and Nanometer Structures, American Institute of Physics, 2 Huntington Quadrangle, Melville, NY 11747, vol. 33, No. 6, Jan. 1, 1901 [retrieved on Jan. 1, 1901].
Extended European Search Report for 17160540.5 dated Jul. 7, 2017.

\* cited by examiner

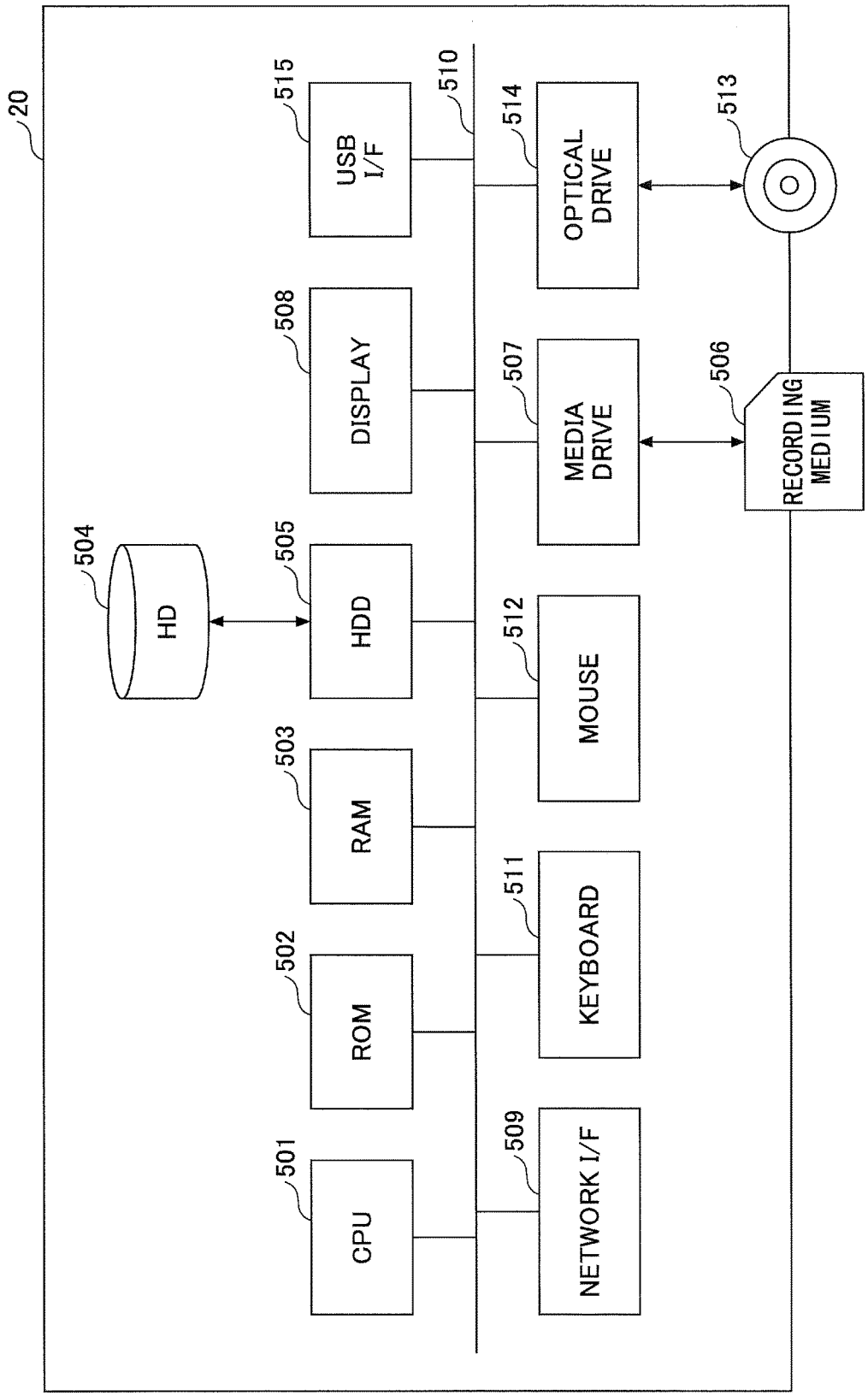

FIG.7
```
G1 X10 Y10 F300
G1 X20 Y10 E5 F600
```
FIG.8A
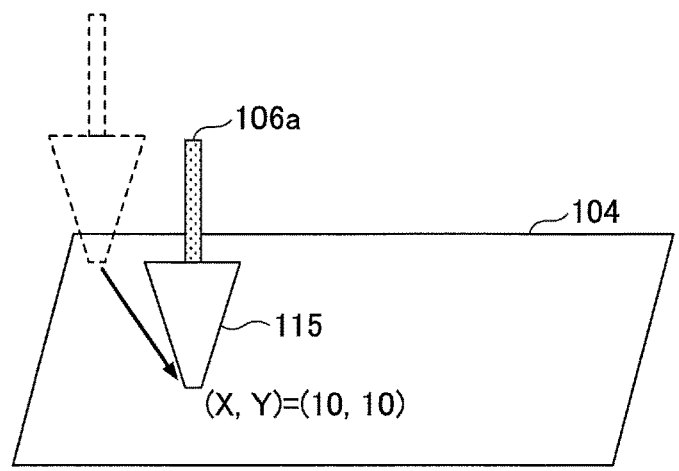
FIG.8B
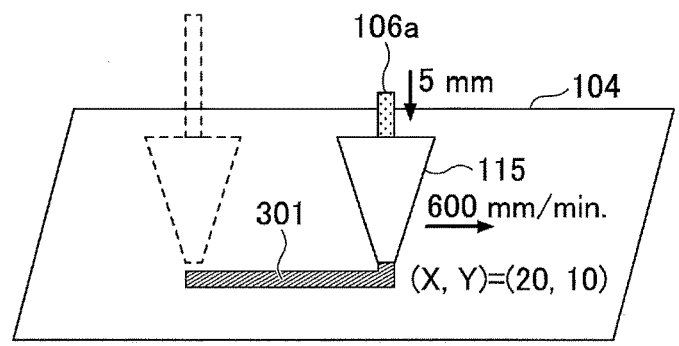

```
G1 X10 Y10 F600
G1 X20 Y10 E4 F600 Da0.4
G1 X30 Y10 E5 F600 Da0.5
G1 X40 Y10 E6 F600 Da0.6
```

NOZZLE DIAMETER
Da

INFORMATION PROCESSING APPARATUS, MODELING SYSTEM, AND INFORMATION PROCESSING METHOD

CROSS-REFERENCE TO RELATED APPLICATION

The present application claims priority under 35 U.S.C. § 119 to Japanese Patent Application No. 2016-054455, filed on Mar. 17, 2016, the entire contents of which are incorporated herein by reference in their entirety.

BACKGROUND OF THE INVENTION

1. Field of the Invention

The present disclosure relates generally to information processing apparatuses, modeling systems, and information processing methods.

2. Description of the Related Art

Additive manufacturing apparatuses configured to form a three-dimensional (3D) model having a solid shape represented by 3D data are known. Additive manufacturing apparatuses are capable of making prototypes and a small lot of parts at low cost and in a short delivery time. While there are various kinds of processes used by additive manufacturing apparatuses to form an object, the basic modeling process of forming a solid shape by layering, from bottom up, slices of data (data slices) into which the solid shape is sliced layer by layer is common to the processes.

For example, additive manufacturing apparatuses configured to eject a liquid resin from an ejection nozzle are known. Furthermore, additive manufacturing apparatuses using cylindrical coordinates ($\gamma \sin \theta$, $\gamma \cos \theta$, $z$) in place of three-dimensional coordinates ($x$, $y$, $z$) as a modeling coordinate system are known. (See, for example, Japanese Unexamined Patent Application Publication No. 2001-301045.) Such additive manufacturing apparatuses include the mechanism of rotating an ejection nozzle about a shaft to enable formation of a curved portion along a curve.

SUMMARY OF THE INVENTION

According to an aspect of the present invention, an information processing apparatus is configured to provide an additive manufacturing apparatus with data for creating a modeling object. The additive manufacturing apparatus includes a layering part configured to layer a material and move in accordance with trajectory information to create the modeling object. The information processing apparatus includes a memory and a processor coupled to the memory. The processor is configured to create a cross-sectional shape of the modeling object using data on the shape of the modeling object, create the trajectory information based on the created cross-sectional shape, and create width information to dynamically vary the width of the material to be layered based on the trajectory information.

BRIEF DESCRIPTION OF THE DRAWINGS

FIG. 3 is a diagram depicting a hardware arrangement of an information processing apparatus according to the embodiment;

FIG. 7 a diagram illustrating G-code as an example of print data according to the embodiment;

FIGS. 8A and 8B diagrams illustrating the ejection nozzle that moves in accordance with print data according to the embodiment;

DESCRIPTION OF THE EMBODIMENTS

Additive manufacturing apparatuses that do not include a rotation mechanism for driving an ejection nozzle in accordance with cylindrical coordinates have the problem of the incapability of adopting a curve forming method as described in Japanese Unexamined Patent Application Publication No. 2001-301045.

According to an aspect of the present invention, an information processing apparatus capable of accurately forming a curved portion is provided.

One or more embodiments are described with reference to the accompanying drawings.

Figure 1A:
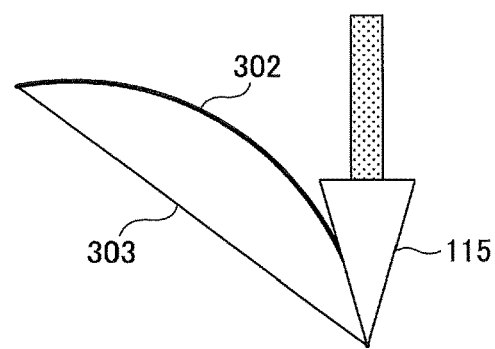
FIGS. 1A through 1C are diagrams illustrating an ejection nozzle moved by an additive manufacturing apparatus and the shaping of a material according to an embodiment.
Figure 1B:
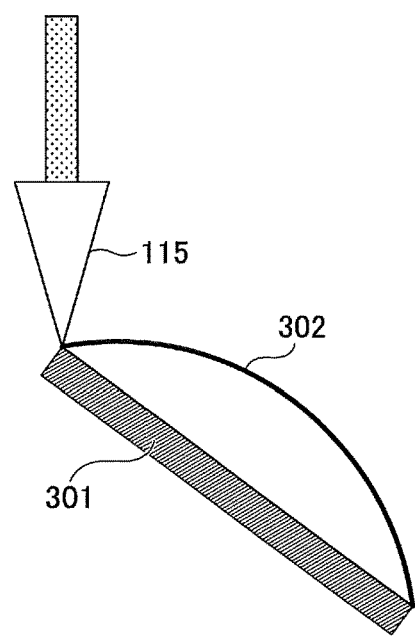
Figure 1C:
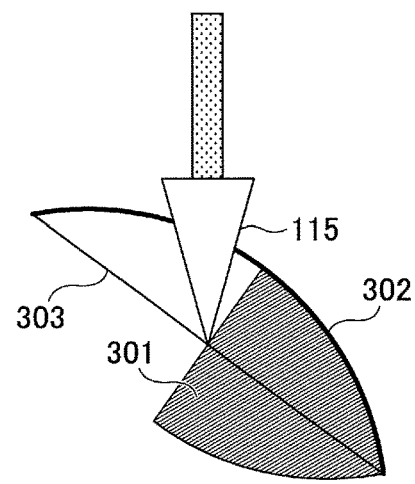

FIGS. 1A through 1C are diagrams illustrating an ejection nozzle 115 moved by an additive manufacturing apparatus according to an embodiment and the shaping of a material. Referring to FIG. 1A, a cross section 302 of 3D data is approximated to a linear outline 303, and the ejection nozzle 115 ejects a material 301 while linearly moving. (More technically, the ejection nozzle 115 ejects the material 301 along a trajectory inside the outline 303 as described below, but still moves linearly.) As a result, as depicted in FIG. 1B, the material 301 is linearly layered along the trajectory of the ejection nozzle 115.

The material 301 is linearly layered as depicted in FIG. 1B because the moving velocity of the ejection nozzle 115 and the amount of supply of the material 301 are constant. Therefore, an information processing apparatus according to this embodiment creates print data that dynamically vary at least one of the moving velocity of the ejection nozzle 115 and the amount of supply of the material 301 when creating the print data of a portion approximated to a straight line. Specifically, the moving velocity of the ejection nozzle 115 is reduced or the amount of supply of the material 301 is increased as the difference between the curved cross section 302 and the outline 303 to which the curved cross section 302 is approximated increases. As a result, the width of the layered material 301 dynamically varies, so that the additive manufacturing apparatus can shape the material 301 over and along the curved cross section 302 as depicted in FIG. 1C.

Thus, the information processing apparatus according to this embodiment creates print data that dynamically vary the moving velocity of the ejection nozzle 115 and the amount of supply of the material 301 while linearly moving the ejection nozzle 115. Therefore, the additive manufacturing apparatus 70 can perform modeling by varying the width of the material 301 so that the material 301 is along the outline of a curved portion of a data slice.

[Terminology of Specification]

The shape of an object of modeling ("modeling object") is a solid shape created by an additive manufacturing apparatus. According to this embodiment, the shape of a modeling object or a modeling object is explained by the term "3D model" by way of example.

Data related to a modeling object may be data that represent a solid or a three-dimensional shape. According to this embodiment, the data related to a modeling object are explained by the term "3D data" by way of example.

Data for modeling are information that an additive manufacturing apparatus interprets to operate to form a 3D model, and include, for example, commands, the contents of control, and settings. According to this embodiment, the data for modeling are explained by the term "print data" by way of example.

The dynamic variation of width means that the width of a single straight line differs depending on a position on the straight line.

Width information is information that affects the width of a material to be layered, and may be further referred to as parameters controllable by an additive manufacturing apparatus among information affecting the width of a material to be layered. Specifically, the width information includes at least one of the moving velocity of the ejection nozzle 115, the amount of supply of the material 301, and a nozzle diameter Da of the ejection nozzle 115.

Figure 2:
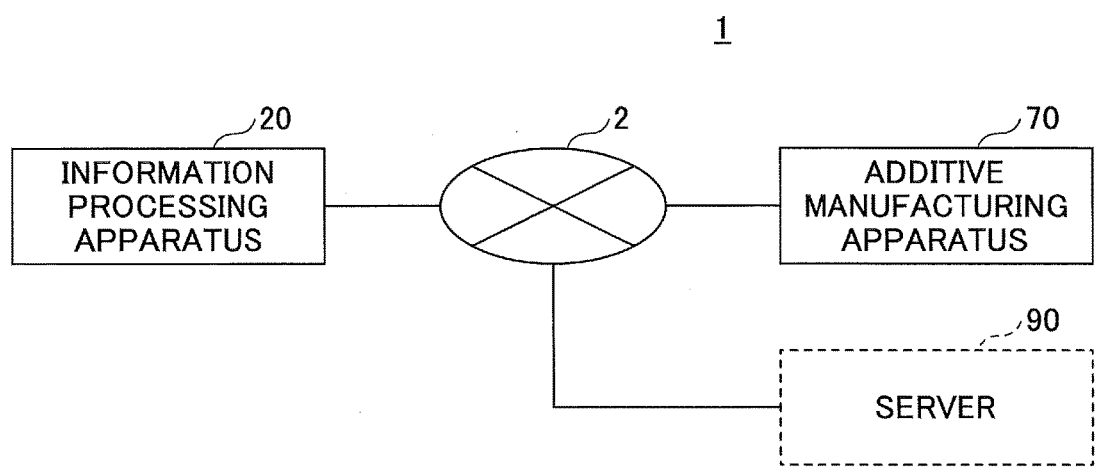
FIG. 2 is a diagram depicting an arrangement of a modeling system according to the embodiment.

FIG. 2 is a diagram depicting an arrangement of a modeling system 1. The modeling system 1 includes an information processing apparatus 20 and an additive manufacturing apparatus 70 that are connected via a network 2. The network 2 is basically a company local area network (LAN), but may include a wide area network (WAN) or the Internet. Furthermore, the information processing apparatus 20 and the additive manufacturing apparatus 70 may be connected by a dedicated line such as a universal serial bus (USB) cable. The network 2 or the dedicated line may be entirely a wired connection, or partly or entirely a wireless connection such as a wireless LAN or Bluetooth (registered trademark).

The information processing apparatus 20 may be, but is not limited to, a personal computer (PC), and may be any apparatus on which the below-described program runs. Other examples of the information processing apparatus 20 include a tablet terminal, a smartphone, a personal digital assistant (PDA), a cellular phone, a wearable PC, a gaming device, a car navigation terminal, an electronic whiteboard, and a projector.

The information processing apparatus 20 analyzes 3D data to build a 3D model, and slices the 3D model at positions equally spaced by the layer thickness (layer pitch) to create data slices. The data slices are converted into print data in a format referred to as "G-code," and the print data are transmitted to the additive manufacturing apparatus 70. The print data may be stored in a storage medium such as a USB memory or a Secure Digital (SD) memory card, and the additive manufacturing apparatus 70 may read the print data from the storage medium attached to a storage medium interface (I/F). Accordingly, the network 2 may be omitted.

The information processing apparatus 20 and the additive manufacturing apparatus 70 may be implemented by a single apparatus. That is, the additive manufacturing apparatus 70 includes the functions of the information processing apparatus 20 to perform processing such as creation of print data from 3D data. Furthermore, the information processing apparatus 20 may transmit 3D data to a server 90 via the network 2, and the server 90 may transmit print data to the additive manufacturing apparatus 70 via the network 2.

The additive manufacturing apparatus 70 creates an object based on print data. Examples of modeling processes employable by the additive manufacturing apparatus 70 include fused deposition modeling (FDM), material jetting, binder jetting, selective laser sintering (SLS), and stereolithography (SLA). According to FDM, basically, heat-melted resin is extruded from a nozzle to be layered to create an object. In addition to resin, for example, metal fluid may be used as a material by the additive manufacturing apparatus 70. According to material jetting, resin jetted from an inkjet head is cured by ultraviolet rays to be layered. According to binder jetting, a liquid binder is jetted from an inkjet head to bond gypsum or resin powder particles layer by layer. According to SLS, powdered material is irradiated with a laser beam to be sintered. According to SLA, a liquid photocurable resin is cured layer by layer, using an ultraviolet laser, to be layered.

According to this embodiment, for convenience of description, an FDM type of additive manufacturing apparatus is described as an example of the additive manufacturing apparatus 70. The method of dynamically varying the width of the material 301 according to this embodiment, however, may be applied to each of the above-described modeling processes, being converted into parameters that are controlled to vary the width in each modeling process.

Next, a hardware arrangement the information processing apparatus 20 is described with reference to FIG. 3, and a hardware arrangement of the additive manufacturing apparatus 70 is described with reference to FIGS. 4A and 4B.

FIG. 3 is a diagram depicting a hardware arrangement of the information processing apparatus 20. The information processing apparatus 20 includes a central processing unit (CPU) 501, a read-only memory (ROM) 502, a random access memory (RAM) 503, a hard disk drive (HDD) 505, a media drive 507, a display 508, a network I/F 509, a keyboard 511, a mouse 512, an optical drive 514, a USB I/F 515, and a bus line 510, such as an address bus or a data bus, which electrically connects the above-described hardware elements.

The CPU 501 is configured to control the operation of the entire information processing apparatus 20. The ROM 502 contains a program used to drive the CPU 501, such as an initial program loader (IPL). The RAM 503 is used as a work area for the CPU 501. A hard disk (HD) 504 is configured to store programs, an operating system (OS), and various kinds of data. The HDD 505 is configured to control reading data from and wiring data to the HD 504 in accordance with the control of the CPU 501. The network I/F 509 is an interface for performing data communications using the network 2. The keyboard 511 is a device including multiple keys for a user to input, for example, characters, numerical values, and various instructions. The mouse 512 is a device for a user to input operations such as selection and execution of instructions, selection of an object of processing, and movement of a cursor. The media drive 507 is configured to control reading data from and writing data to (storing data in) a recording medium 506 such as a flash memory. The optical drive 514 is configured to control reading data from and writing data to an optical disk 513 such as a compact disc-ROM (CD-ROM), a digital versatile disc (DVD), or a Blu-ray disc. The optical disk 513 is an example of removable recording media. The display 508 is configured to display various kinds of information, such as a cursor, menus, windows, characters, letters, and images. The display 508 may be a projector. The USB I/F 515 is an interface for connecting USB devices such as a USB cable and a USB memory.

Figure 4A:
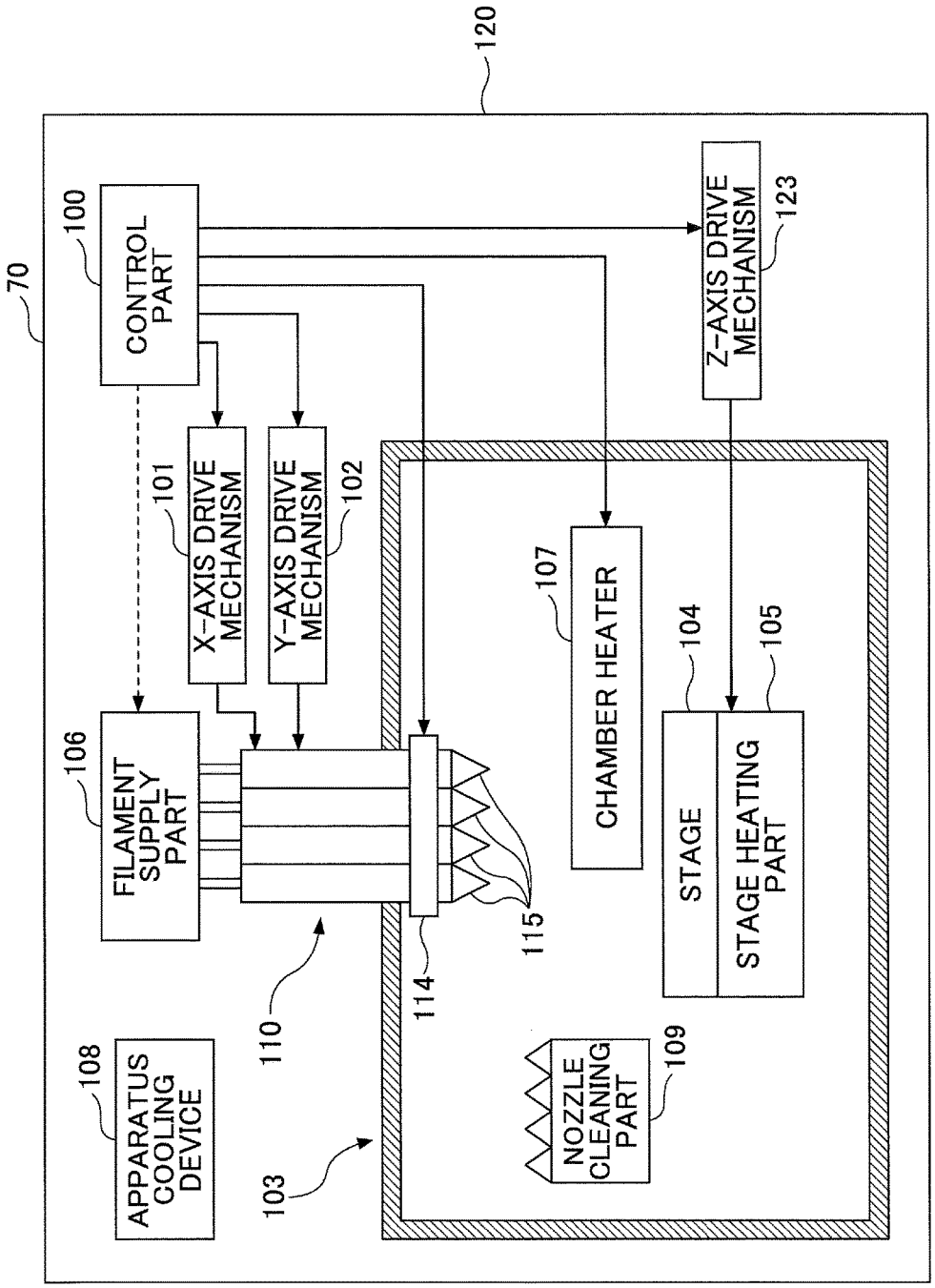
FIGS. 4A and 4B are diagrams depicting an arrangement of the additive manufacturing apparatus according to the embodiment.

FIG. 4A is a diagram depicting an arrangement of the additive manufacturing apparatus 70. The additive manufacturing apparatus 70 includes a body frame 120 and a chamber 103 provided in the body frame 120. The inside of the chamber 103 serves as a processing space for creating a three-dimensional object. A stage 104 serving as a placement table is provided in the processing space, namely, inside the chamber 103. A three-dimensional object is created on this stage 104.

A forming head 110 serving as a model forming part is provided above the stage 104 in the chamber 103. The forming head 110 includes the ejection nozzles 115 at the bottom of the forming head 110. The ejection nozzles 115 eject a filament that is a modeling material. According to this embodiment, while the four ejection nozzles 115 are provided at the bottom of the forming head 110 in FIG. 4A, the number of ejection nozzles 115 may be determined as desired. The forming head 110 further includes a head heating part 114 that is a modeling material heating part serving as a heating part configured to heat the filament supplied to the ejection nozzles 115.

The filament has a long thin wire shape, and is set in a wound state in the additive manufacturing apparatus 70. The filament is supplied to each of the ejection nozzles 115 of the forming head 110 by a filament supply part 106 connected to the forming head 110. The ejection nozzles 115 may be supplied with the same filament or respective different filaments. According to this embodiment, the filament supplied by the filament supply part 106 is heated and melted by the head heating part 114, and the molten filament is ejected in an extrusion-like manner from a predetermined one or more of the ejection nozzles 115, thereby successively stacking layer-shaped modeling structures on the stage 104 to create a three-dimensional object.

Instead of the filament, which is a modeling material, a supporting material that does not constitute a three-dimensional object may be supplied to the ejection nozzles 115. The supporting material is formed of a material different from the material of the filament, and is eventually removed from a three-dimensional object formed of the filament. The supporting material as well is heated and melted by the heating part 114, and the molten supporting material is ejected in an extrusion-like manner from a predetermined one or more of the ejection nozzles 115 to be successively layered.

The forming head 110 is held onto an x-axis drive mechanism 101, extending in the left-right direction of the additive manufacturing apparatus 70, to be movable along the lengthwise direction (x-axis direction) of the x-axis drive mechanism 101. The forming head 110 can be moved in the left-right direction of the additive manufacturing apparatus 70 (the x-axis direction) by the driving force of the x-axis drive mechanism 101. Each lengthwise end of the x-axis drive mechanism 101 is held onto a y-axis drive mechanism 102, extending in the front-rear direction of the additive manufacturing apparatus 70, to be slidable along the lengthwise direction (y-axis direction) of the y-axis drive mechanism 102. The x-axis drive mechanism 101 is moved along the y-axis direction by the driving force of the y-axis drive mechanism 102 to move the forming head 110 along the y-axis direction.

According to this embodiment, the additive manufacturing apparatus 70 includes a chamber heater 107 inside (in the processing space of) the chamber 103. The chamber heater 107 serves as a processing space heating part configured to heat the inside of the chamber 103. Because a three-dimensional object is created using FDM according to this embodiment, it is preferable to execute a modeling process with the temperature inside the chamber 103 being maintained at a target temperature. Therefore, according to this embodiment, preheating is performed to increase the temperature inside the chamber 103 to a target temperature in advance before the start of a modeling process. During preheating, the chamber heater 107 heats the inside of the chamber 103 to increase the temperature inside the chamber 103 to the target temperature. During a modeling process, the chamber heater 107 heats the inside of the chamber 103 to maintain the temperature inside the chamber 103 at the target temperature. The operation of the chamber heater 107 is controlled by a control part 100 of the additive manufacturing apparatus 70 described below.

Figure 4B:
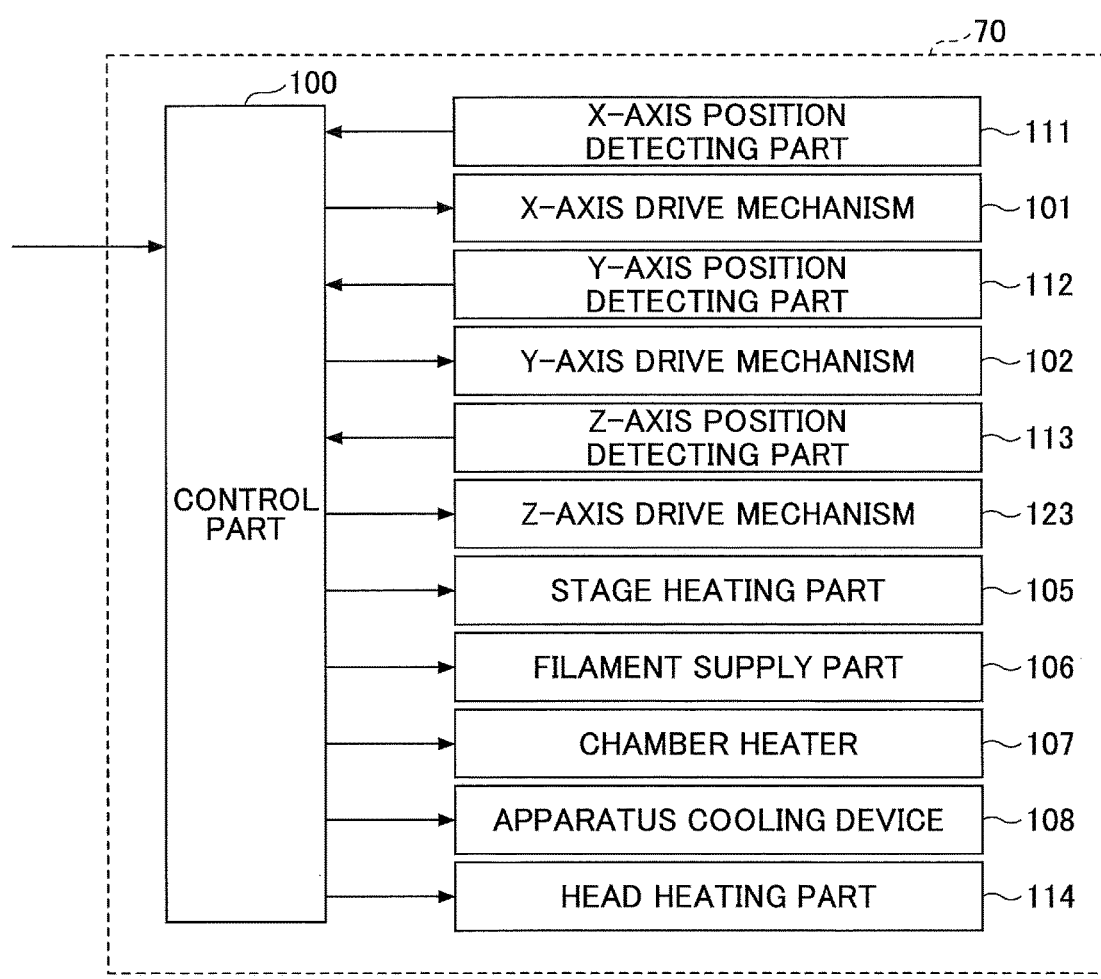

FIG. 4B is a control block diagram of an additive manufacturing apparatus according to this embodiment. The additive manufacturing apparatus 70 includes an x-axis position detecting mechanism 111 configured to detect the x-axis direction position of the forming head 110. The result of detection by the x-axis position detecting mechanism 111 is transmitted to the control part 100. The control part 100 controls the x-axis drive mechanism 101 based on the detection result to move the forming head 110 to a target x-axis direction position.

The additive manufacturing apparatus 70 further includes a y-axis position detecting mechanism 112 configured to detect the y-axis direction position of the x-axis drive mechanism 101 (the y-axis direction position of the forming head 110). The result of detection by the y-axis position detecting mechanism 112 is transmitted to the control part 100. The control part 100 controls the y-axis drive mechanism 102 based on the detection result to move the forming head 110 on the x-axis drive mechanism 101 to a target y-axis direction position.

The additive manufacturing apparatus 70 further includes a z-axis position detecting mechanism 113 configured to detect the z-axis direction position of the stage 104. The result of detection by the z-axis position detecting mechanism 113 is transmitted to the control part 100. The control part 100 controls a z-axis drive mechanism 123 based on the detection result to move the stage 104 to a target z-axis direction position.

The control part 100 thus controls the movements of the forming head 110 and the stage 104 to move the relative three-dimensional positions of the forming head 110 and the stage 104 in the chamber 103 to target three-dimensional positions.

The additive manufacturing apparatus 70 further includes a stage heating part 105 configured to heat the stage 104, an apparatus cooling device 108 configured to cool the inside of the additive manufacturing apparatus 70, and a nozzle cleaning part 109 configured to clean the ejection nozzles 115.

Figure 5:
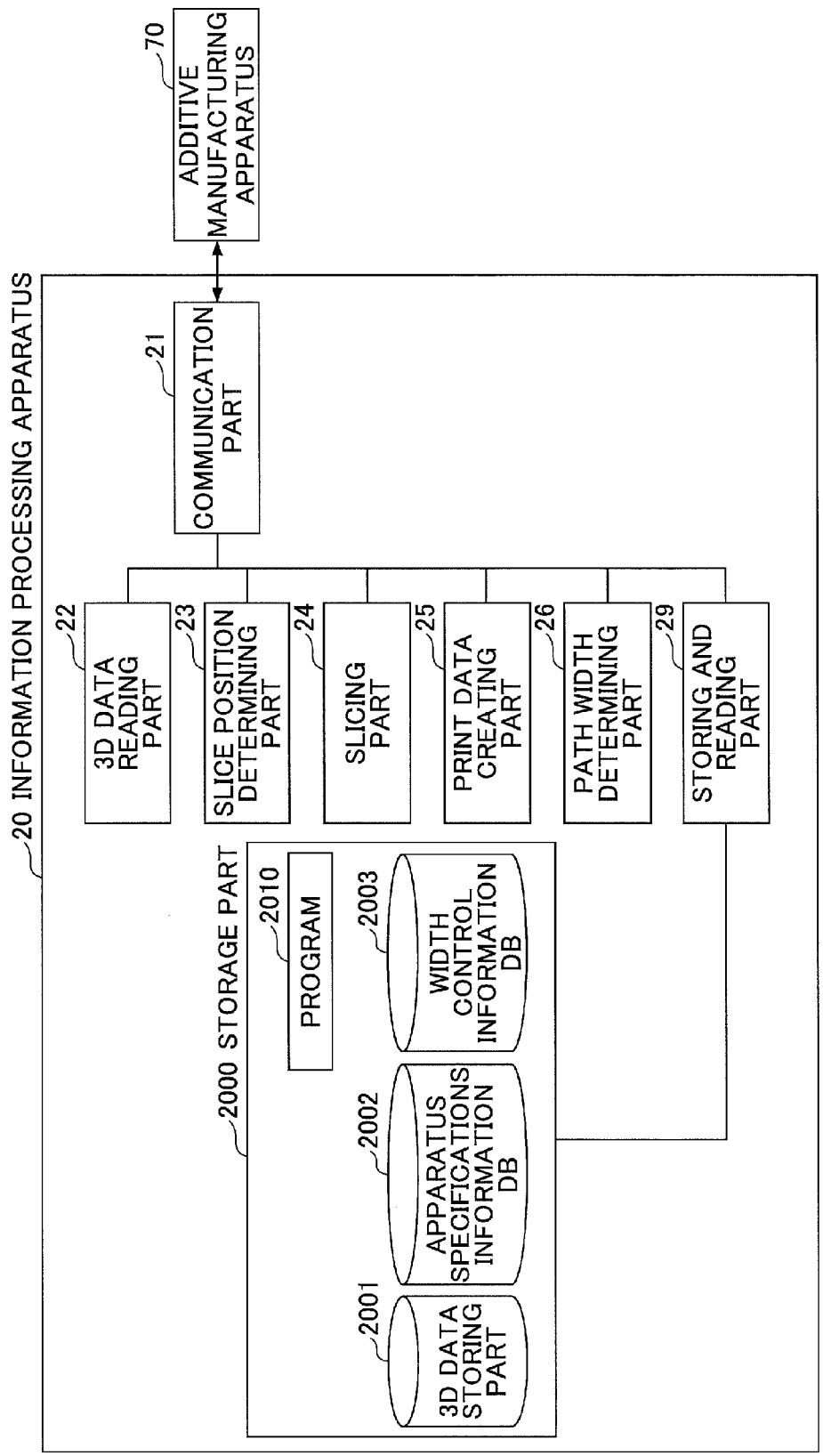
FIG. 5 is a diagram depicting a functional arrangement of the modeling system including the information processing apparatus and the additive manufacturing apparatus according to the embodiment.

Next, a functional arrangement of the modeling system 1 is described. FIG. 5 is a diagram depicting a functional arrangement of the modeling system 1 including the information processing apparatus 20 and the additive manufacturing apparatus 70.

The information processing apparatus 20 includes a program 2010. The information processing apparatus 20 executes the program 2010 to implement basic functions as described below.

The information processing apparatus 20 includes a communication part, a 3D data reading part 22, a slice position determining part 23, a slicing part 24, a print data creating part 25, a path width determining part 26, and a storing and reading part 29. These functions of the information processing apparatus 20 are functions each implemented by or functional parts each caused to operate by one of the elements depicted in FIG. 3 operating at a command from the CPU 501 according to the program 2010 loaded into the RAM 503 from the HD 504.

The information processing apparatus 20 further includes a storage part 2000 implemented by the HD 504 depicted in FIG. 3. The storage part 2000 contains a 3D data storage part 2001, an apparatus specifications information database (DB) 2002, a width control information DB 2003, and the program 2010. The program 2010 is distributed, being stored in the recording medium 506 or the optical disk 513 depicted in FIG. 3, or is delivered from a server that delivers programs. The program 2010 may be referred to as either "printer driver" or "application program." Furthermore, the program 2010 described in this embodiment may include two or more programs such as a printer driver and an application program.

The 3D data storage part 2001 contains 3D data. The 3D data may be read from a portable storage medium such as a USB memory by the information processing apparatus 20 or the additive manufacturing apparatus 70, downloaded from a server connected via a network, or created by a 3D application that runs on the information processing apparatus 20. The 3D application is, for example, software referred to as 3D computer-aided design (CAD) software or 3D computer graphics (CG) software. The data format of the output 3D data of the 3D application may be, but is not limited to, a standard triangulated language (STL), and may be, for example, 3MF, PLY, or OBJ.

TABLE 1

```
solid ascii
    facet normal 0.000000 0.000000 1.000000
        outer loop
            vertex    0.000000 2.000000 5.000000
            vertex   -2.000000 2.000000 5.000000
            vertex    0.000000 0.000000 5.000000
        endloop
    endfacet
    facet normal 0.000000 0.000000 1.000000
        outer loop
            vertex    0.000000 0.000000 5.000000
            vertex   -2.000000 2.000000 5.000000
            vertex   -2.000000 0.000000 5.000000
        endloop
    endfacet
    facet normal 0.000000 0.000000 -1.000000
        outer loop
            vertex    0.000000 0.000000 0.000000
            vertex   -2.000000 0.000000 0.000000
            vertex    0.000000 2.000000 0.000000
        endloop
    endfacet
    ...(OMITTED)...
Endsolid
```

Table 1 illustrates an example of 3D data, which is in a file format referred to as STL. STL is a format that represents a shape using triangular polygons (facets). The vertices and the normal vector (facet normal) of a triangle in a three-dimensional space are information on a single triangle.

In Table 1, the information between "facet normal" and "endfacet" represents information on a single triangle. Furthermore, "normal" represents the normal vector of a triangle, and three "vertex" represent the coordinates of the three vertices of a triangle. This data set of a triangle is repeated to represent a three-dimensional shape. A surface of a 3D model is represented by the vertices of triangles. Therefore, it is possible to calculate data slices and detect curved portions by performing geometric calculations.

As described above, 3D data may be in any format as long as the 3D data represent a three-dimensional shape. When the surface shape of a solid shape is known, a surface may be divided into triangles to be converted to STL.

TABLE 2

| Ejection Width Range | 0.5 mm to 10 mm |
|---|---|
| Velocity Range | 1 mm/min. to 1000 mm/min. |

Table 2 schematically illustrates information stored in the apparatus specifications information DB 2002. The apparatus specifications information DB 2002 contains the specifications of the additive manufacturing apparatus 70. According to this embodiment, an ejection width range and a velocity range are stored. Other specifications of the specifications of the additive manufacturing apparatus 70 may be stored, but are omitted in Table 2. The ejection width range indicates the minimum ejection width and the maximum ejection width achievable by the additive manufacturing apparatus 70. The unit of variation of the ejection width (the size by which the ejection width may be varied) may be stored. The velocity range indicates the minimum moving velocity and the maximum moving velocity of the ejection nozzles 115 of the additive manufacturing apparatus 70 at the time when the ejection nozzles 115 move. The specifications of Table 2, however, are a mere example, and the additive manufacturing apparatus 70 may operate beyond the specifications of Table 2. Furthermore, the ejection width range and the velocity range may be independently controllable, or one of the ejection width range and the velocity range may be determined to automatically determine the other.

TABLE 3

| Distance D (mm) | Amount of Supply (mm) | Moving Velocity (mm/min.) |
|---|---|---|
| 0.5 | S1 | V1 |
| 0.6 | S2 | V2 |
| 0.7 | S3 | V3 |
| 0.8 | S4 | V4 |
| . | . | . |
| . | . | . |
| . | . | . |

Table 3 schematically illustrates information stored in the width control information DB 2003. The width control information DB 2003 contains the amount of supply and a moving velocity in correlation with a distance D. The distance D is the distance between (the outer edge of) the cross section 302 of a 3D model 500 (FIG. 9) and a trajectory 304 (FIGS. 11C, 11D, 12A, and 12B) inside the outline 303, which is a straight line to which the cross section 302 is approximated. The distance D is described in detail below with reference to, for example, FIG. 12A. The amount of supply is the amount of supply of the material 301 required to fill in the distance D between the cross section 302 of the 3D model 500 and the trajectory 304. The amount of supply is the amount of supply per unit length of the trajectory 304. The moving velocity is a moving velocity preferable for the material 301 to fill in the distance D between the cross section 302 of the 3D model 500 and the trajectory 304. While both the amount of supply and the moving velocity vary as the distance D changes in Table 3, there may be a range where one of the amount of supply and the moving velocity may be constant as the distance D changes. Furthermore, the amount of supply and the moving velocity, which are affected by material characteristics, such as the viscosity and specific gravity of a material, and an ejection method, are empirically determined.

Next, functions of the information processing apparatus 20 are described with reference to FIGS. 3 and 5. The communication part 21 is implemented by, for example, commands from the OS and the CPU 501, and the network I/F 509, and is configured to perform communications with the additive manufacturing apparatus 70. Specifically, the communication part 21 is configured to transmit print data into which 3D data are converted to the additive manufacturing apparatus 70.

The 3D data reading part 22 is implemented by, for example, commands from the CPU 501, and the HDD 504, and is configured to read 3D data from the 3D data storage part 2001.

The slice position determining part 23 is implemented by, for example, commands from the CPU 501, and is configured to determine the slice positions of a 3D model at which the 3D model is sliced. The height of the 3D model is segmented at the slice positions at regular intervals of a layer thickness from the bottom of the 3D model. The layer thickness is, for example, a constant value slightly greater than or equal to a minimum layer thickness achievable by the additive manufacturing apparatus 70, and is determined automatically or by a user. This makes it possible to improve the modeling quality of a created object. A user may determine a constant value sufficiently greater than the minimum layer thickness as the layer thickness. This makes it possible to reduce time for modeling.

The slicing part 24 is implemented by, for example, commands from the CPU 501, and is configured to perform processing related to creation of a 3D model. Specifically, the slicing part 24 is configured to dispose a 3D model represented by 3D data in a virtual space of the additive manufacturing apparatus 70. A user's operation may be received to determine the orientation of the 3D model. The slicing part 24 is configured to equally slice the 3D model in the z-axis direction (into layers of the same thickness), and create a cross-sectional shape of the 3D model at each z coordinate obtained by the slicing. The interval between slice positions, which is constant according to this embodiment, may be variable. The 3D data are represented by polygons. Therefore, once a z coordinate is determined, the x and y coordinates of the polygons of the z coordinate are determined. The slice data are a set of the x and y coordinates of the cross section of the polygons.

The print data creating part 25 is implemented by, for example, commands from the CPU 501, and is configured to create print data based on the slice data. The print data includes the trajectory, the moving velocity, and the amount of ejection of one or more of the ejection nozzle 115 (hereinafter collectively referred to as "ejection nozzle 15"). A single operation of the ejection nozzle 115 is defined by a trajectory (the coordinates of two points), a moving velocity, and the amount of supply of a material. The trajectory, the moving velocity, and the amount of supply of a material may be collectively referred to as "tool path." The moving velocity and the amount of ejection with respect to the trajectory of a curved portion are subject to change by the path width determining part 26. The print data are often written in G-code, but the format of print data is not limited according to this embodiment. The print data may be written in any format interpretable by the additive manufacturing apparatus 70. An example of G-code is described with reference to FIG. 7.

The path width determining part 26 is implemented by, for example, commands from the CPU 501, and is configured to determine at least one of the moving velocity of the ejection nozzle 115 and the amount of supply of a material to the ejection nozzle 115 for achieving the width of a material capable of modeling a curved portion.

The storing and reading part 29 is implemented by, for example, commands from the CPU 501, and the HDD 505, and is configured to store data in the storage part 2000 and read data from the storage part 2000. In the following description, the reading of data from or the writing of data to the storage part 2000 by the information processing apparatus 20 may be described without reference to the intermediation of the storing and reading part 29.

Figure 6:
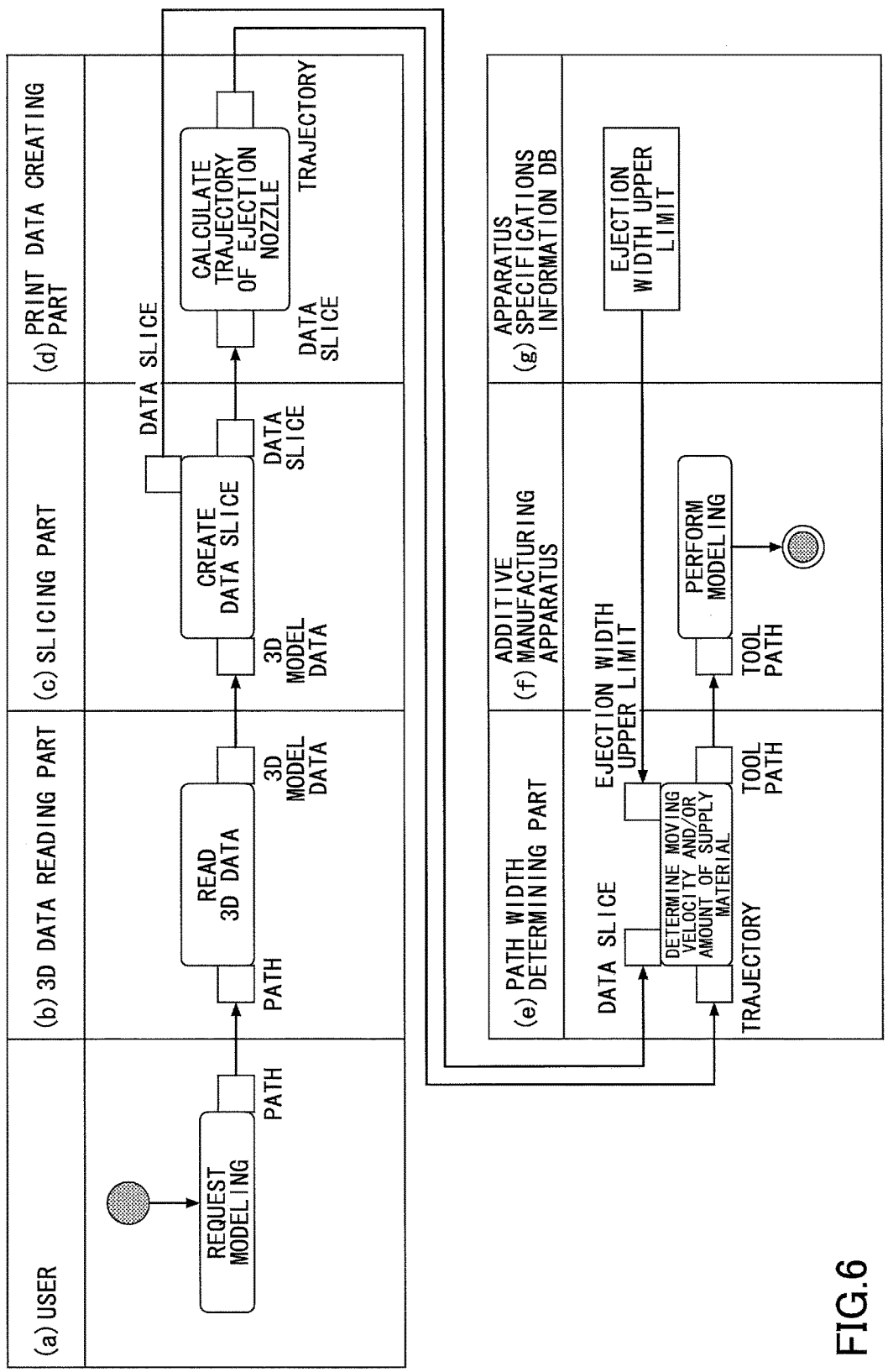
FIG. 6 is an activity diagram depicting an overall operational procedure of the modeling system according to the embodiment.

FIG. 6 is an activity diagram depicting an overall operational procedure of the modeling system 1, which includes the following:

(a) a user specifies the path of a folder or directory in which 3D data are stored, and performs an operation to start modeling on the information processing apparatus 20;

(b) the 3D data reading part 22 reads the 3D data, and, for example, coverts the 3D data into a format interpretable by the information processing apparatus 20;

(c) the slicing part 24 slices the 3D data at given heights to create data slices;

(d) the print data creating part 25 calculates the trajectory of the ejection nozzle 115 for forming the outline of each data slice and filling in the inside of the outline. The moving velocity and the amount of supply of a material may be determined with respect to a trajectory created based on a linear cross-section (a constant material width);

(e) the path width determining part 26 determines the width of a material to achieve a curved portion based on the input data slices and trajectory of the ejection nozzle 115, and determines at least one of the moving velocity of the ejection nozzle 115 and the amount of supply of a material to the ejection nozzle 115 with which the determined width of a material is obtained;

(f) the additive manufacturing apparatus 70 creates an object in accordance with print data; and (g) the apparatus specifications information DB 2002 provides the ejection width range achievable by the additive manufacturing apparatus 70.

Next, print data (G-code) are described. FIG. 7 is a diagram illustrating G-code as an example of print data. One line represents one command of print data. While the contents of one command may vary, here, one command is a command as to the movement of the ejection nozzle 115. A command that starts with G1 indicates the movement of the ejection nozzle 115 and the supply of a material. The first line is a command to move at a given acceleration so that the moving velocity at the time of reaching a position of X=10, Y=10 is 300 mm/min. The second line is a command to supply a material of 5 mm while moving at a given acceleration so that the moving velocity at the time of reaching a position of X=20, Y=20 is 600 mm/min. That is, because the moving velocity is 300 mm/min at the position of X=10, Y=10, the moving velocity increases while moving from (X, Y)=(10, 10) to (X, Y)=(20, 20).

G-code is often used in an FDM type of additive manufacturing apparatus. The print data, however, may be in any format as long as the print data represent the trajectory (a set of the coordinates of two points) and the moving velocity of the ejection nozzle 115 and the amount of supply of a material to the ejection nozzle 115. Suitable print data according to a modeling process are used in other types of additive manufacturing apparatuses than FDM.

Next, a movement of the ejection nozzle 115 based on print data is described. FIGS. 8A and 8B are diagrams illustrating the ejection nozzle 115 that moves in accordance with print data. FIGS. 8A and 8B depict the stage 104 on which a material is layered and the ejection nozzle 115. The ejection nozzle 115 is supplied with a material referred to as a filament 106a, and the filament 106a is ejected from the ejection nozzle 115. Referring to FIG. 8A, the ejection nozzle 115 moves from a position indicated by a dashed line to the position of (X, Y)=(10, 10) at the command of the first line of FIG. 7.

Likewise, when the ejection nozzle 115 is at the position indicated by a dashed line in FIG. 8B, the ejection nozzle 115 moves at a given acceleration so that the moving velocity of the ejection nozzle 115 at the time of reaching the position of (X, Y)=(20, 20) is 600 mm/min. at the command of the second line of FIG. 7. During the movement from (X, Y)=(10, 10) to (X, Y)=(20, 20), the ejection nozzle 115 uniformly ejects 5 mm of the material. Accordingly, given that the moving velocity is constant, the width of the material 301 increases as the amount of supply increases. Given that the amount of supply is constant, the width of the material 301 increases as the moving velocity decreases.

FIGS. 8A and 8B illustrate an ejection according to FDM. For example, according to an SLA type of additive manufacturing apparatus, the ejection nozzle 115 emits ultraviolet radiation to cure a bed of liquid resin over the stage 104. In this case, the width of irradiation may be varied to vary the width of a formed line.

Figure 9:
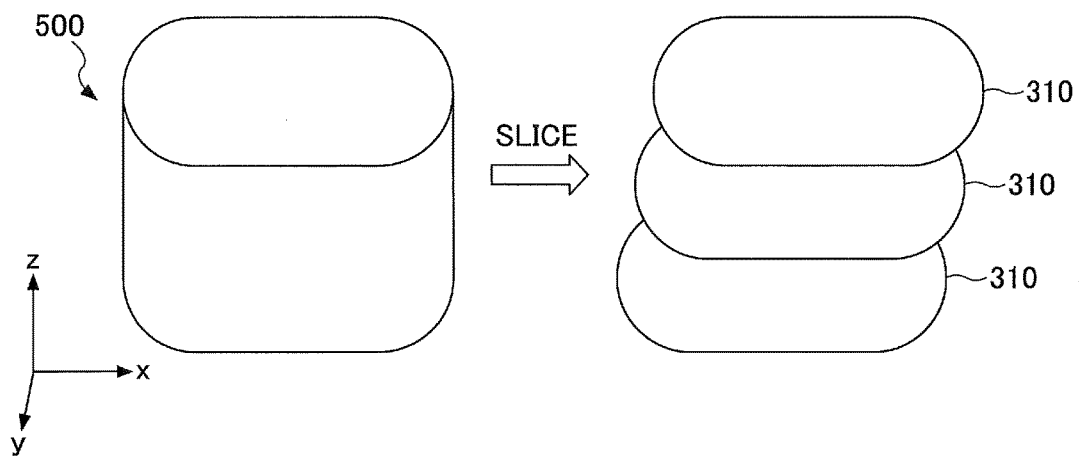
FIG. 9 is a schematic diagram illustrating data slices according to the embodiment.

Next, the creation of data slices is described. FIG. 9 is a schematic diagram illustrating data slices. In FIG. 9, the 3D model 500 is depicted on the left side, and cross sections of the 3D model taken at planes parallel to the x-y plane are depicted on the right side. Each of the cross sections is one of data slices (slice data) 310.

Figure 10:
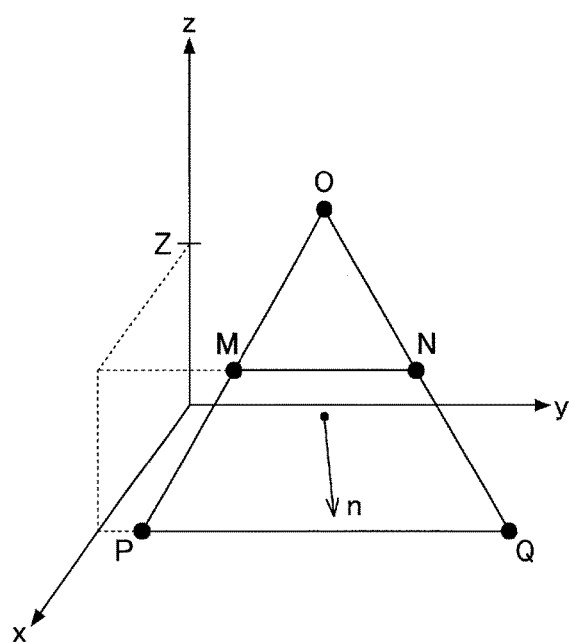
FIG. 10 is a diagram illustrating creation of data slices according to the embodiment.

FIG. 10 is a diagram illustrating creation of data slices. For convenience of description, a single polygon in a three-dimensional space is taken as an example. A normal vector n (a, b, c) and the coordinates of the vertices O, P, and Q are given by STL. A plane including this polygon is expressed by the following equation:

$$a(x-Xo)+b(y-Yo)+c(z-Zo)=0,$$

where (Xo, Yo, Zo) are the coordinates of one of the vertices O, P, and Q.

To slice the polygon at a z coordinate, z is substituted by Z, and the equation of the line MN of ax+by=constant is determined. Here, M is a point at height Z on the side OP, and N is a point at height Z on the side OQ. The line MN exists only within the polygon. Therefore, the line MN can be determined by determining the coordinates of the points M and N. The point M is a point at height Z on a straight line passing through the vertices O and P, and the point N is a point at height Z on a straight line passing through the vertices O and Q. This line MN is a cross-sectional shape in the case of slicing the polygon.

In FIG. 10, a cross-sectional shape is depicted with respect to a single polygon that is part of the 3D model 500. The same processing as described above is performed on all polygons at the slice positions of the 3D model 500 to obtain the data slices 310 as depicted in FIG. 9.

Figure 11A:
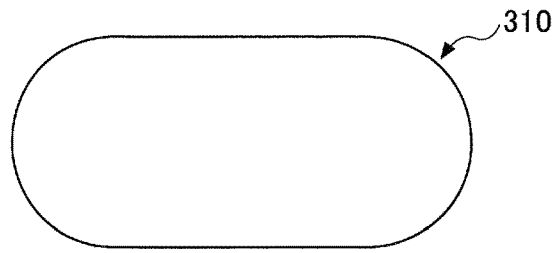
FIGS. 11A through 11D are diagrams illustrating creation of an outline according to the embodiment.

The creation of the outline of a data slice is described with reference to FIGS. 11A through 11D. First, it is assumed that the data slice 310 as depicted in FIG. 11A is created. While the data slice is depicted as having a stadium shape (or a planar shape constructed of a rectangle with semicircles at a pair of opposite sides) in FIG. 11A, practically, a curved portion as well is formed of multiple small straight lines (polygons).

With respect to the data slice having a stadium shape, the print data creating part 25 creates the outline of the ejection nozzle 115, and calculates the trajectory of the ejection nozzle 115 based on the outline. First, the print data creating part 25 detects a curved portion from the cross section 302 of the data slice 310. The cross section 302 of the data slice 310 is constructed of points (technically, a set of straight lines). Therefore, a straight line can be detected by executing the Hough transform or the method of least squares on three or more points. Accordingly, if three or more points cannot be approximated to only one straight line, the points are determined to be a curved portion.

Figure 11B:
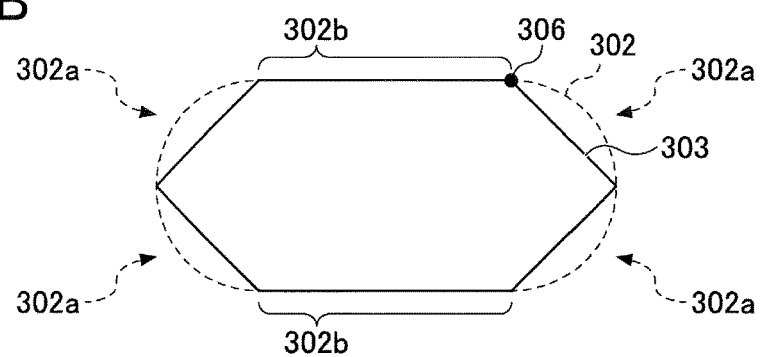

Referring to FIG. 11B, the print data creating part 25 approximates the cross section 302 of a curved portion 302a to straight lines to calculate the outline 303. This is because the ejection nozzle 115 is allowed to move only linearly. The number of straight lines to which the curved portion 302a is approximated is suitably determined. For example, in the case of approximating the curved portion 302a with straight lines of a fixed length, the print data creating part 25 calculates the distance from a starting point 306 of the curved portion 302a (the end point of a straight line portion 302b) to each of points of the curved portion 302a in order of proximity of the points to the starting point 306, and approximates (part of) the curved portion 302a with a straight line that connects the starting point 306 and a point between which the distance is closest to the fixed length.

Alternatively, the print data creating part 25 may approximate the curved portion 302a with straight lines, so that the angle between straight lines to which parts of the curved portion 302a are approximated is less than or equal to a threshold. In this case, a straight line is created between the starting point 306 of the curved portion 302a and each of points of the curved portion 302a in a sequential manner, and the angle between each of the created straight lines and the straight line portion 302b (extending to the starting point 306) are calculated. Straight lines are created until the angle to the straight line portion 302b exceeds the threshold, and a straight line whose angle to the straight line portion 302b is less than or equal to the threshold and is largest is determined as (part of) the outline 303. Thereafter, straight lines are evaluated based on the angle to the outline 303 in the same manner.

Figure 11C:
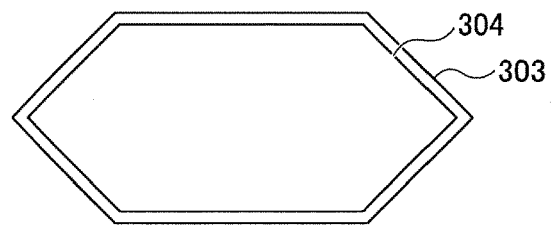

Once the outline 303 is thus determined, the print data creating part 25 creates the trajectory 304 inside the outline 303 of the data slice 310 approximated with straight lines as depicted in FIG. 11C. The trajectory 304 is created inside the outline 303 in consideration of the width of a material to be ejected ("material width"). It is assumed that the initial value of the material width is predetermined.

Figure 11D:
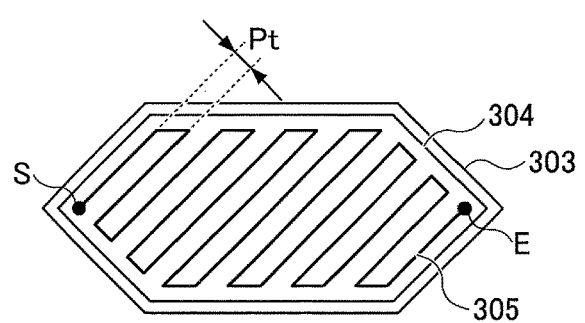

Next, the print data creating part 25 creates a trajectory for filling (hereinafter referred to as "filling trajectory 305") inside the trajectory 304. The trajectory 304 and the filling trajectory 305 are the trajectory information of trajectories in which the ejection nozzle 115 moves. FIG. 11D depicts the filling trajectory 305 for the ejection nozzle 115 to fill in the inside of the trajectory 304 while moving back and forth. The print data creating part 25 sets a starting point S at a position offset inward by the material width relative to the leftmost end or the rightmost end of the trajectory 304. The print data creating part 25 creates a straight line extending parallel to a first straight line portion of the trajectory 304 from the starting point S in a first direction. When the straight line reaches a point offset inward by the material width relative to another (second) straight line portion of the trajectory 304, the print data creating part 25 changes the direction of the straight line to a direction parallel to the second straight line portion of the trajectory 304, and extends the straight line. Once the straight line extends for a fixed pitch Pt, the print data creating part 25 changes the direction of the straight line to a second direction which is parallel to the first straight line portion of the trajectory 304 and opposite to the first direction, and extends the straight line. The print data creating part 25 continues the above-described process until there is no space left for ejecting the material, and ends the process at an end point E where the space runs out. The filling trajectory 305 is thus created by a single stroke to eliminate an idle running distance (a distance the ejection nozzle 115 travels without layering a material). Therefore, it is possible to reduce time for layering.

The trajectory 304 and the filling trajectory 305 depicted in FIG. 11D serve as the trajectory of the ejection nozzle 115. The trajectory 304 and the filling trajectory 305 include multiple straight lines. Therefore, the trajectory 304 and the filling trajectory 305 are expressed by the coordinates of two points representing a straight line of each straight line (with a starting point and an end point as well being specified).

Figure 12A:
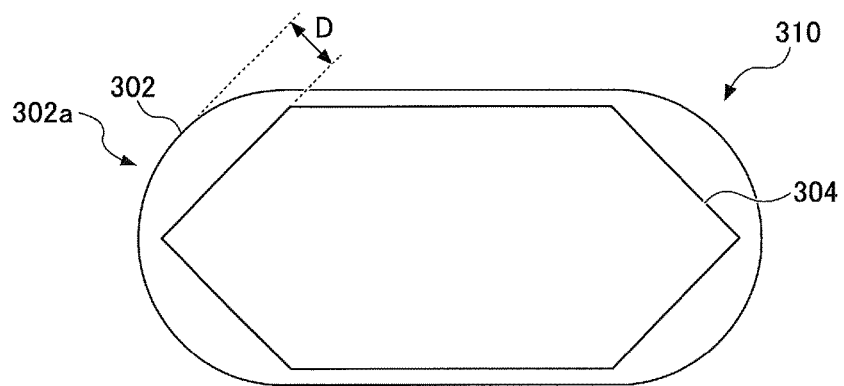
FIGS. 12A and 12B are diagrams for illustrating a process of determining the amount of supply of a material and moving velocity for obtaining a curved portion according to the embodiment.
Figure 12B:
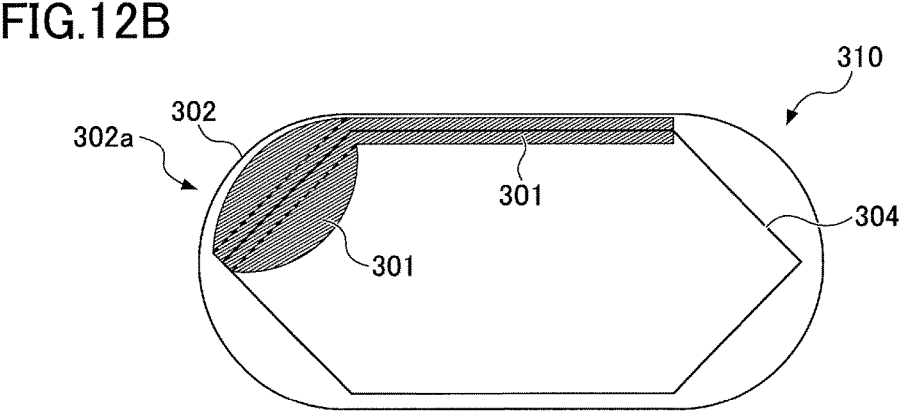

FIGS. 12A and 12B are diagrams for illustrating a process of determining the amount of supply of a material and moving velocity for obtaining a curved portion. The path width determining part 26 determines at least one of the amount of supply and moving velocity based on the material width required for obtaining a curved portion. That is, when the moving velocity of the ejection nozzle 115 is reduced or the amount of supply of a material to the ejection nozzle 115 is increased, the amount of a material ejected per unit time from the ejection nozzle 115 increases, so that the material width increases. Conversely, when the moving velocity of the ejection nozzle 115 is increased or the amount of supply of a material to the ejection nozzle 115 is reduced, the material width decreases.

The trajectory 304 for the data slice 310 is expressed with straight lines as depicted in FIGS. 12A and 12B. Therefore, conventionally, the moving velocity of an ejection nozzle and the amount of supply of a material to the ejection nozzle are constant. In contrast, according to this embodiment, at least one of the moving velocity of the ejection nozzle 115 and the amount of supply of a material to the ejection nozzle 115 is dynamically varied to eject the material along the curved portion 302a of the data slice 310. As a result, it is possible to express a curve with a linear movement of the ejection nozzle 115.

First, as depicted in FIG. 12A, the path width determining part 26 calculates the distance D between the cross section 302 determined as the curved portion 302a and the trajectory 304. The distance D is determined at each position on the trajectory 304 corresponding to the curved portion 302a. Practically, it is difficult to determine the distance D at each position on the trajectory 304. The length of a perpendicular line dropped from each point of the polygons of the curved portion 302a to the trajectory 304 may be determined as the distance D. Alternatively, a distance to each point of the polygons of the curved portion 302a may be determined with respect to each of points on the trajectory 304 spaced at regular intervals of, for example, 0.1 mm, and the shortest distance may be determined as the distance D of the point on the trajectory 304.

A value twice the distance D is the width of the material 301 required to eject the material 301 along the curved portion 302a. The path width determining part 26 determines at least one of the moving velocity of the ejection nozzle 115 and the amount of supply of a material to the ejection nozzle 115, referring to the width control information DB 2003 where at least one of the moving velocity and the amount of supply of a material is correlated with the distance D.

FIG. 12B schematically illustrates the width of the material 301 obtained with the moving velocity and the amount of supply of a material determined by the path width determining part 26. As depicted in FIG. 12B, a large amount of the material 301 is ejected to follow the shape of the curved portion 302a where the distance D is large. As a result, the material 301 is ejected to fill in the gap between the trajectory 304 and the curved portion 302a, so that the curved portion 302a of the 3D model 500 can be formed.

Figure 13:
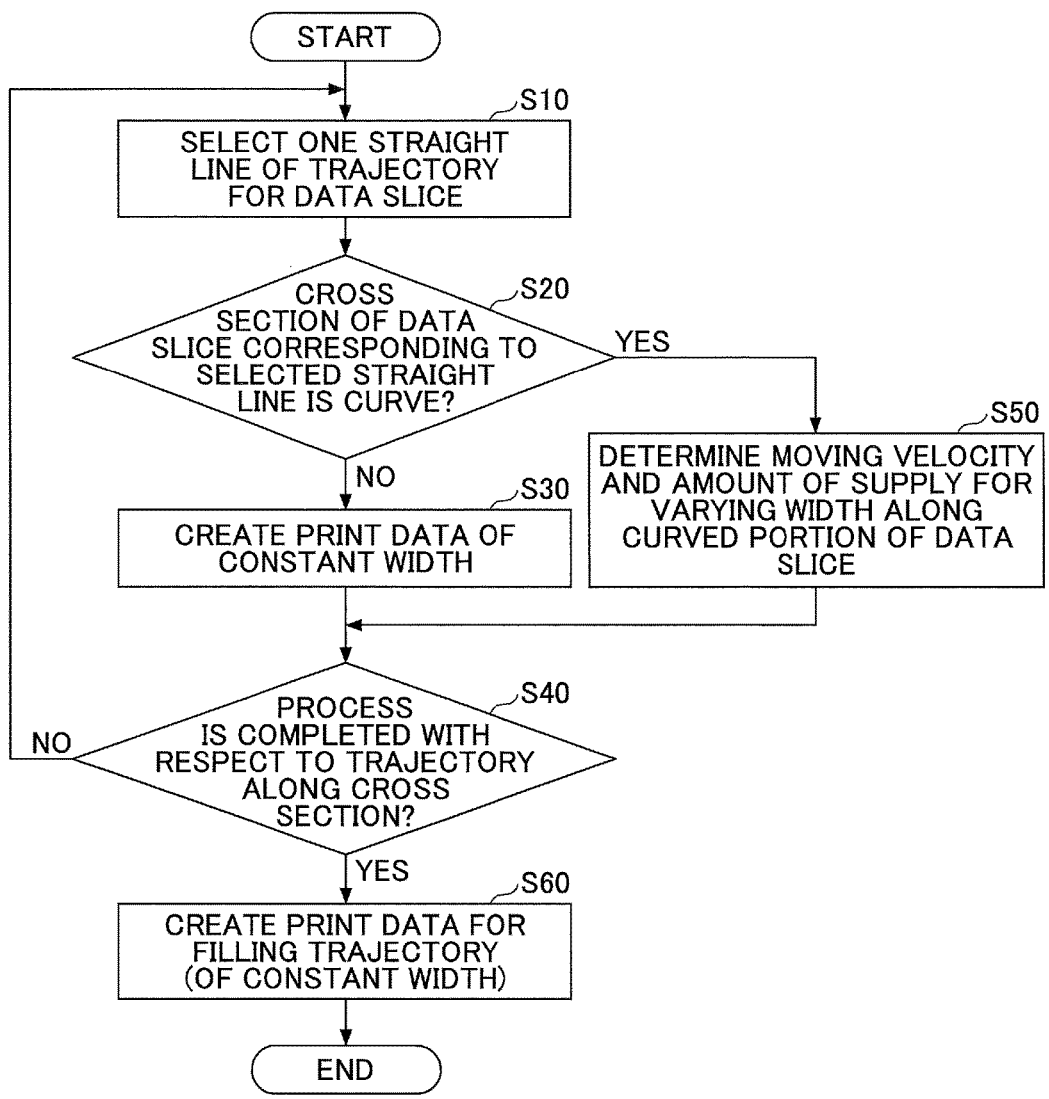
FIG. 13 is a flowchart illustrating a process of creating print data by the information processing apparatus according to the embodiment.

FIG. 13 is a flowchart illustrating a process of creating print data by the information processing apparatus 20. The process of FIG. 13 starts in response to creation of the trajectory 304 and the filling trajectory 305 with respect to a data slice. Furthermore, the moving velocity and the amount of ejection of the ejection nozzle 115 are initially determined with respect to each of the trajectory 304 and the filling trajectory 305.

First, at step S10, the print data creating part 25 selects one straight line from the trajectory 304.

Next, at step S20, the print data creating part 25 determines whether the cross section 302 of the data slice corresponding to the selected straight line is a curve. Part of the cross section 302 corresponding to a straight line is the part of the cross section 302 closest to the straight line.

Whether the cross section 302 is a straight line is determined by, for example, the Hough transform as described above.

In response to determining at step S20 that the cross section 302 of the data slice corresponding to the selected straight line is a curve (YES at step S20), at step S50, the path width determining part 26 determines at least one of the amount of ejection and the moving velocity for varying the material width along the cross section 302 of the data slice in the manner as described above with reference to FIGS. 12A and 12B. Specifically, the moving velocity of the ejection nozzle 115 and/or the amount of supply of a material to the ejection nozzle 115 (the value of E and/or the value of F in G-code) is dynamically varied in print data. Therefore, a single straight line may be drawn by multiple commands.

Alternatively, if a single command to dynamically vary a moving velocity and/or the amount of supply of a material is prepared for G-code, such a command may be used. As the trajectory 304, the moving velocity, and the amount of supply of a material are determined, the print data creating part 25 creates print data.

If it is determined at step S20 that the cross section 302 of the data slice corresponding to the selected straight line is not a curve (NO at step S20), at step S30, the print data creating part 25 creates print data using the trajectory 304, and the moving velocity and the amount of supply of a material for a constant material width.

Next, at step S40, the print data creating part 25 determines whether the process is completed with respect to the trajectory 304 along the cross section 302 of the data slice. If the process is not completed (NO at step S40), the process returns to step S10.

If the process is completed (YES at step S40), at step S60, the print data creating part 25 creates print data for the filling trajectory 305 inside the trajectory 304, using the filling trajectory 305, the moving velocity of the ejection nozzle 115, and the amount of supply of a material to the ejection nozzle 115. The material width according to the print data created at step S60 may be constant. Therefore, the moving velocity and the amount of supply of a material may remain initial values.

Thus, the information processing apparatus 20 according to this embodiment creates print data that dynamically vary the moving velocity of the ejection nozzle 115 and/or the amount of supply of the material 301 to the ejection nozzle 115 while linearly moving the ejection nozzle 115. Therefore, the additive manufacturing apparatus 70 can perform modeling while varying the width of the material 301 along the outline of a curved portion of a data slice.

Next, deletion of an overlap of a modeled material is described. As described above, the material width may be varied to provide the material 301 along the cross section of a curved portion of a data slice. The material 301 and the filling trajectory 305, however, may overlap.

Figure 14A:
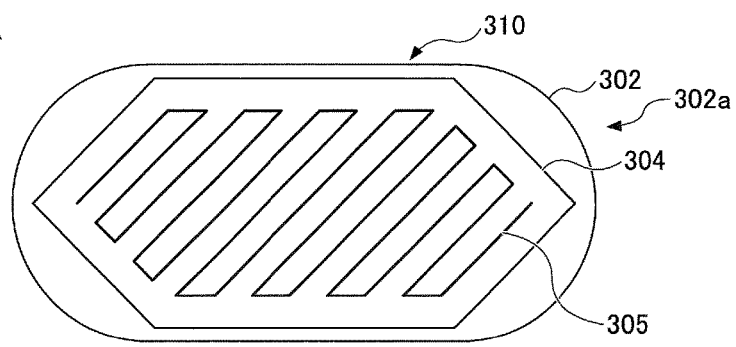
FIGS. 14A through 14D are diagrams illustrating the overlap between the material ejected along a cross section of the curved portion and a filling trajectory according to the embodiment.
Figure 14B:
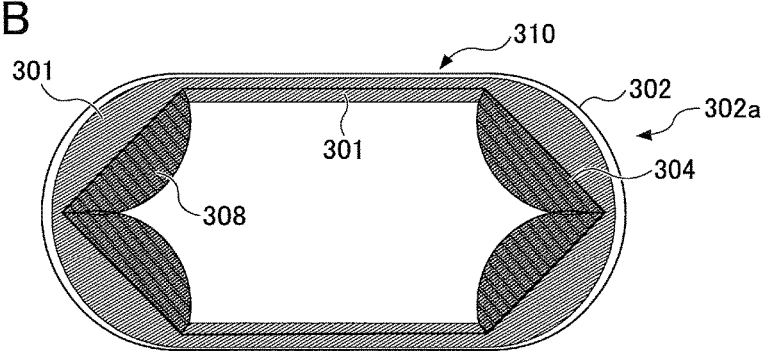
Figure 14C:
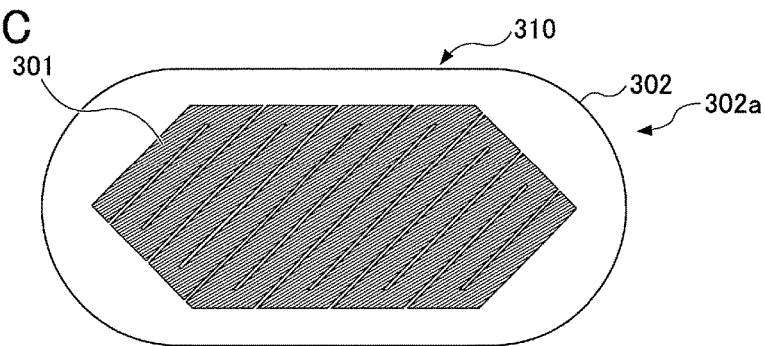
Figure 14D:
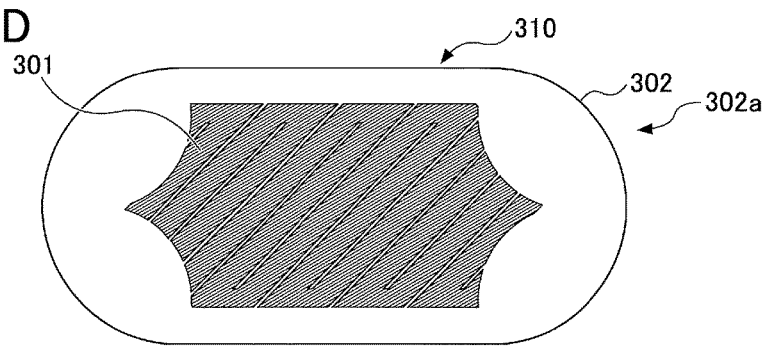

This overlap is described with reference to FIGS. 14A through 14D. FIG. 14A, which is similar to FIG. 11D, depicts trajectories created by the print data creating part 25. FIG. 14B depicts the material 301 that is ejected along the cross section 302 of the curved portion 302a. A comparison of FIGS. 14A and 14B indicates that there is an overlap 308 between the filling trajectory 305 and the material 301. The overlap 308 is indicated by oblique lines on the material 301 in FIG. 14B. In this case, because the material 301 is excessively supplied, the material 301 may overflow to degrade the modeling quality. Therefore, as depicted in FIGS. 14C and 14D, the print data creating part 25 of the information processing apparatus 20 removes the overlap 308 with the material 301 from the filling trajectory 305.

Figure 15A:
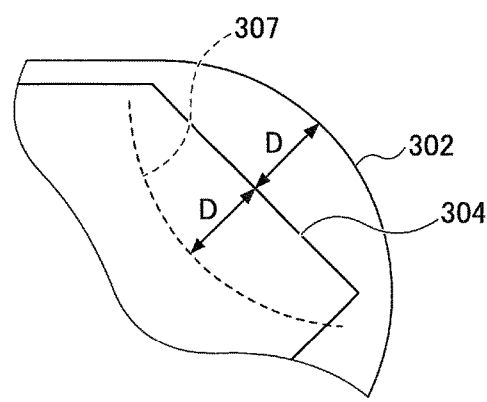
FIGS. 15A through 15C are diagrams illustrating a process of removing the overlap according to the embodiment.

A process of removing such an overlap is described with reference to FIGS. 15A through 15C. As depicted in FIG. 15A, the distance D between the cross section 302 and the trajectory 304 is calculated. The material 301 ejected along the cross section 302 is symmetrical with respect to the trajectory 304. Accordingly, the material 301 ejected along the cross section 302 extends up to the distance D in the inward direction from the trajectory 304 on the data slice. The print data creating part 25 identifies an inner edge 307 of the material 301 having a shape symmetrical with respect to the trajectory 304 and removes the filling trajectory 305 in the range from the cross section 302 to the inner edge 307 in the following manner. The inner edge 307 and the outer edge (the curved portion 302a) of the cross section 302 are symmetrically positioned with respect to the trajectory 304.

First, the filling trajectory 305 is extracted line by line, and it is determined whether both the starting point and the end point of the extracted line of the filling trajectory 305 are within the range of the distance D from the trajectory 304. If both the starting point and the end point are within the range of the distance D from the trajectory 304, this line of the filling trajectory 305 is deleted.

If one of the starting point and the end point is within the range of the distance D from the trajectory 304, the one of the starting point and the end point is replaced with coordinates specified by the distance D. Specifically, straight lines 621 and 622 that are at the distance D from the trajectory 304 and parallel to the trajectory 304 are formed, and an intersection T' of the straight line 621 and the filling trajectory 305 and an intersection U' of the straight line 622 and the filling trajectory 305 are determined. Each of the intersections T' and U' is determined as a new staring or end point.

Figure 15B:
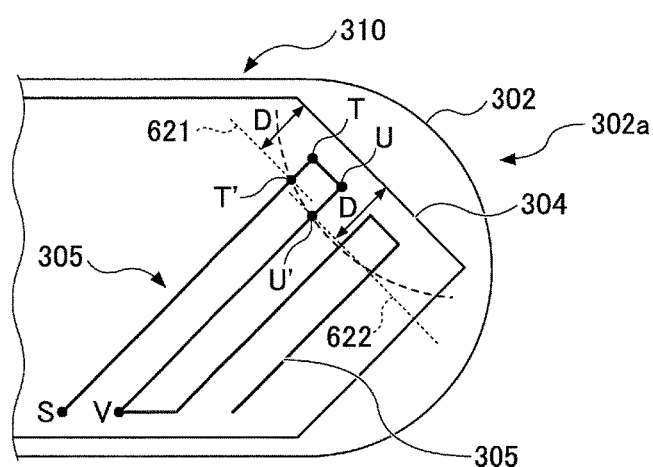
Figure 15C:
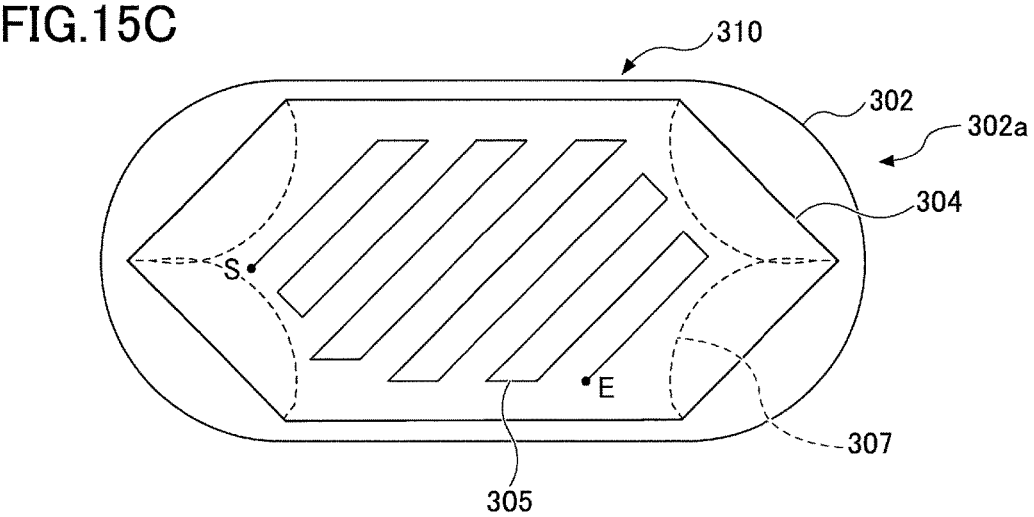

A straight line of the filling trajectory 305 extending between a starting point T and an end point U in FIG. 15B is deleted. Whether the starting point T or the end point U is within the range of the distance D from the trajectory 304 is easily determined by calculating the distance between the starting point T or the end point U and the trajectory 304. Next, a straight line of the filling trajectory 305 whose starting point is the point S and whose end point is the point T has the point T positioned within the range of the distance D from the trajectory 304. Therefore, the print data creating part 25 creates the straight line 621, and determines the intersection T' of the straight line 621 and the straight line of the filling trajectory 305 extending between the points S and T. A straight line whose starting point is the point S and whose end point is the intersection T' is a filling trajectory (part of the filling trajectory 305) from which an overlap is removed. With respect to a straight line of the filling trajectory 305 whose starting point is a point V and whose end point is the point U as well, a straight line whose staring point is the point V and whose end point is the point U' is likewise determined as a filling trajectory (part of the filling trajectory 305) from which an overlap is removed. The intersections T' and U' may be further offset by the material width toward the points S and V, respectively.

As a result, part of the filling trajectory 305 as depicted in FIG. 14C is removed as depicted in FIG. 14D. Accordingly, it is possible to eliminate the overlap between the filling trajectory 305 and the material 301 and to prevent the material 301 from being excessively supplied to degrade the modeling quality.

Referring to FIG. 14D, the filling trajectory 305 is shortened, and is therefore not formed by a single stroke to be interrupted. In this case, there is a time when the ejection nozzle 115 travels without ejecting a material, and therefore, modeling may take time. Therefore, as depicted in FIG. 15C, the print data creating part 25 may first set the inner edge 307 at the distance D from the trajectory 304, and thereafter create the filling trajectory 305. This makes it possible to reduce time for modeling.

Figure 16:
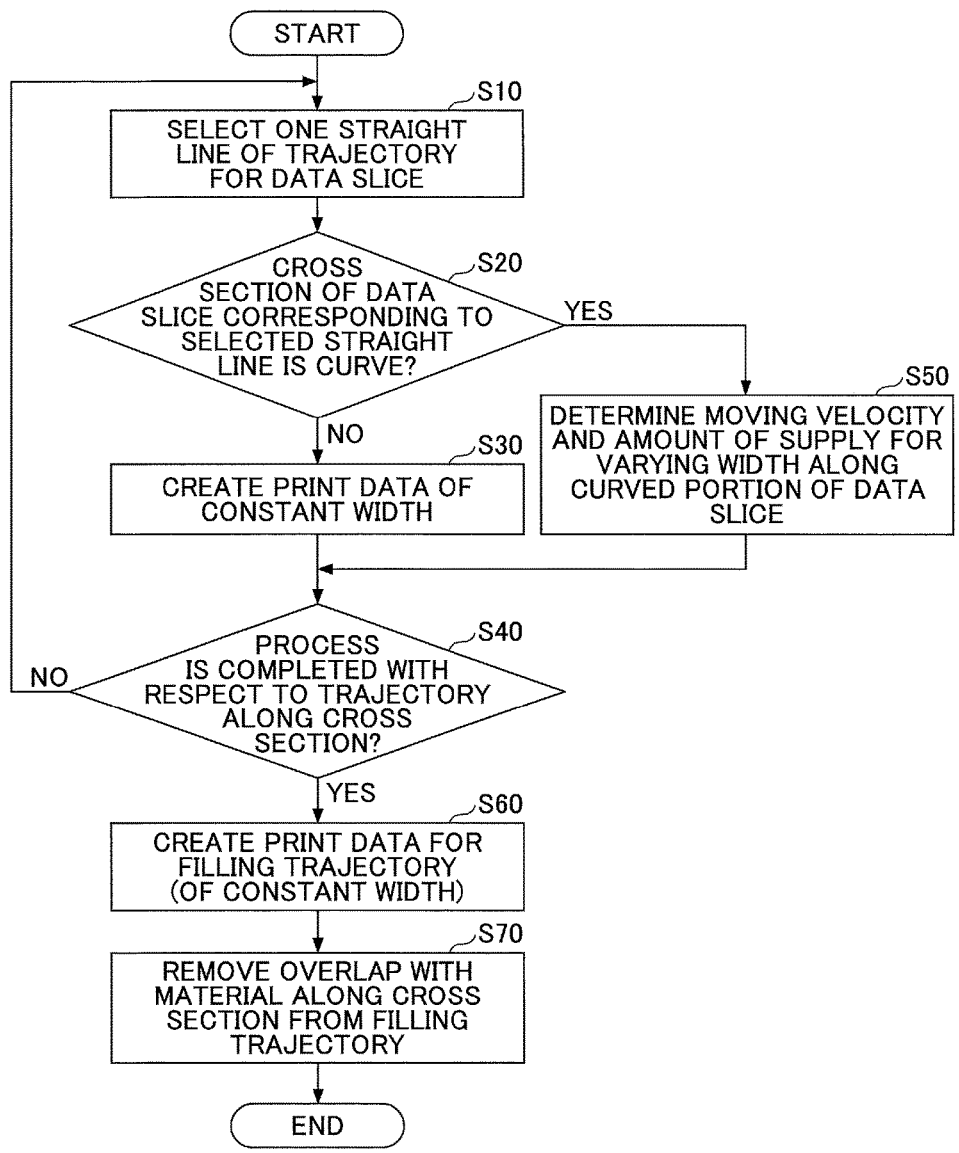
FIG. 16 is a flowchart illustrating a process of creating print data without an overlap by the information processing apparatus according to the embodiment.

Next, a process of creating print data without an overlap by the information processing apparatus 20 is described. FIG. 16 is a flowchart illustrating a process of creating print data without an overlap by the information processing apparatus 20. In the following, differences from the process of FIG. 13 are basically described. The process of steps S10 through S60 is the same as in FIG. 13.

Subsequent to step S60, at step S70, the print data creating part 25 removes an overlap with the material 301 ejected along the cross section 302 from the filling trajectory 305.

Thus, it is possible to prevent use of an extra material and degradation of the modeling quality.

Next, a restriction due to an ejection width range is described. As described with reference to Table 2, the ejection width range is fixed in the additive manufacturing apparatus 70. Accordingly, it is not preferable for the amount of ejection of the material determined to be ejected along the cross section 302 of the curved portion 302a to exceed the ejection width range. Therefore, the print data creating part 25 restricts the amount of ejection of a material for print data to the ejection width range as follows.

Figure 17:
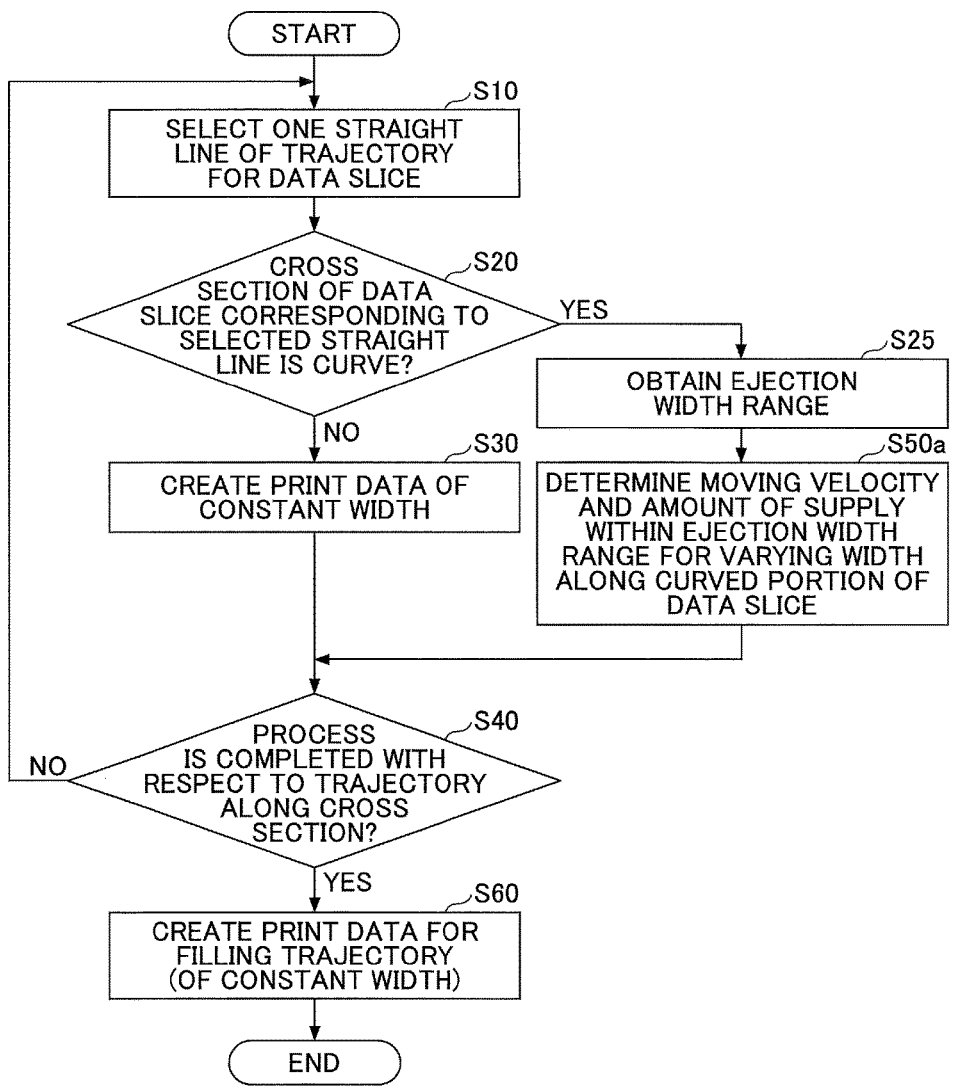
FIG. 17 is a flowchart illustrating a process of creating print data with respect to which the amount of ejection of a material is restricted, by the information processing apparatus according to the embodiment.

FIG. 17 is a flowchart illustrating a process of creating print data with respect to which the amount of ejection of a material is restricted, by the information processing apparatus 20. In the following, differences from the process of FIG. 13 are basically described. The process of steps S10 through S40 and S60 is the same as in FIG. 13.

In response to determining at step S20 that the cross section 302 of the data slice corresponding to the selected straight line is a curve (YES at step S20), at step S25, the print data creating part 25 obtains an ejection width range from the apparatus specifications information DB 2002.

Next, at step S50a, the path width determining part 26 determines at least one of the amount of ejection within the ejection width range and the moving velocity for varying the material width along the cross section 302 of the data slice. For example, if the amount of ejection determined based on information of the width control information DB 2003 exceeds the upper limit of the ejection width range, the amount of ejection is replaced with the upper limit value.

The additive manufacturing apparatus 70 is limited in ejection width because of a mechanism such as the ejection nozzle 115 as described above (that is, the additive manufacturing apparatus 70 cannot eject a material in an extremely thick or thin line), in order to be more appropriately used by users. According to the process of FIG. 17, even if the actual width of ejection of a material is somewhat different from an ideal width, the amount of ejection is prevented from becoming larger than is expected to allow a user to appropriately use the additive manufacturing apparatus 70.

Next; changing a nozzle diameter is described. While the case of changing the amount of ejection (supply) of a material and/or the moving velocity of the ejection nozzle 115 to vary the material width is described above, it is also effective to change the diameter of the ejection nozzle 115 as a measure for varying the material width if the additive manufacturing apparatus 70 has the function of changing the diameter of the ejection nozzle 115.

Figure 18A:
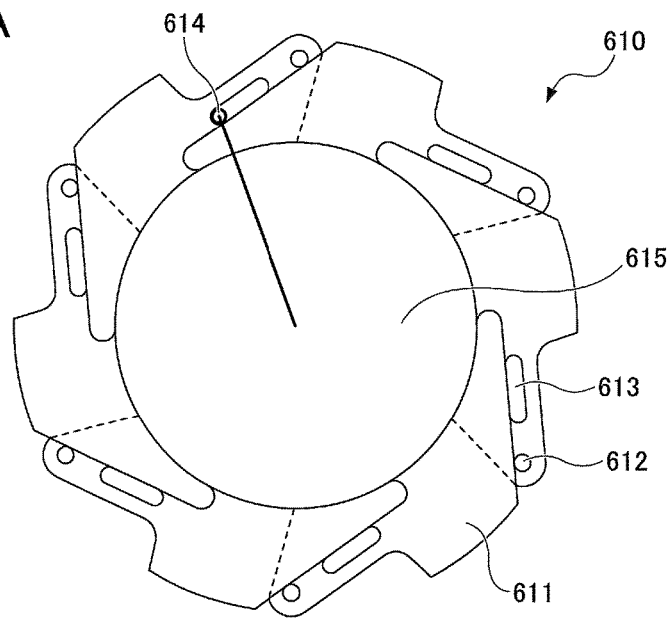
FIGS. 18A and 18B are diagrams illustrating a diameter control structure to change a nozzle diameter according to the embodiment.
Figure 18B:
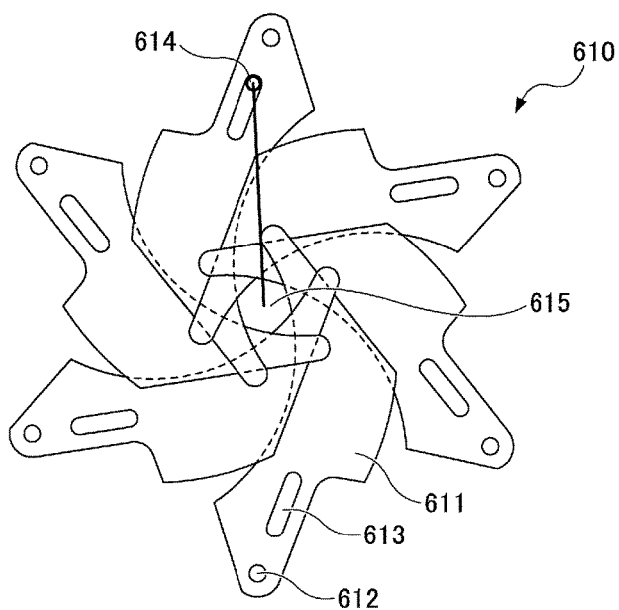

FIGS. 18A and 18B are diagrams illustrating a diameter control structure 610 to change a nozzle diameter. The diameter control structure 610 includes six blade members 611. Each blade member 611 includes a circular hole 612 that serves as a pivot (supporting) point and a cam hole 613 for driving the blade member 611. A pin 614 that pivots about the central axis of the diameter control structure 610 engages with the cam hole 613. FIG. 18A depicts the open state of the diameter control structure 610, in which the pin 614 is positioned at the end of the cam hole 613 more distant from the circular hole 612 in each blade member 611. Each blade member 611 pivots about the circular hole 612 in accordance with the positional relationship between the cam hole 613 and the pin 614.

When the diameter control structure 610 pivots the pins 614 clockwise, the pins 614 move along the cam holes 613 to pivot the blade member 611 in a direction to narrow an opening 615 as depicted in FIG. 18B. Accordingly, the amount of pivoting of the pins 614 may be controlled to control the diameter of the opening 615.

When the additive manufacturing apparatus 70 includes the diameter control structure 610, the print data creating part 25 of the information processing apparatus 20 controls a nozzle diameter Da in addition to the moving velocity of the ejection nozzle 115 and the amount of supply of a material to the ejection nozzle 115 to create print data. A mechanism for controlling the nozzle diameter Da may be, but is not limited to, the diameter control structure 610 depicted in FIGS. 18A and 18B.

Figures 19, 20:
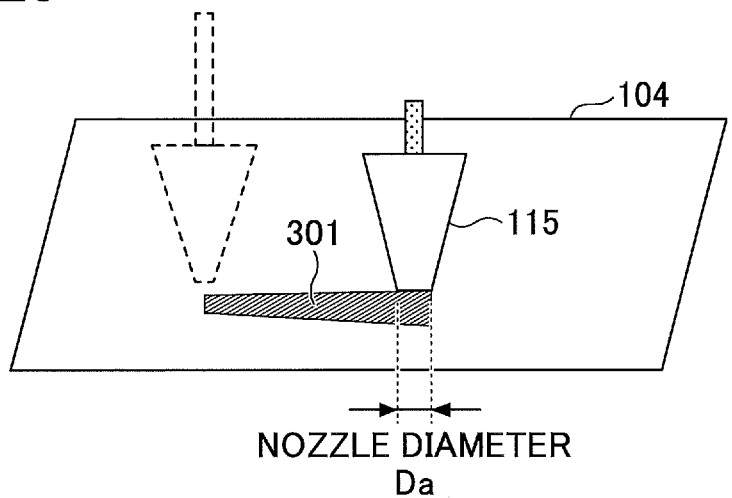
FIG. 19 is a diagram depicting print data including the nozzle diameter according to the embodiment.
FIG. 20 is a schematic diagram depicting the width of the material in the case where the nozzle diameter dynamically varies according to the embodiment.

FIG. 19 illustrates print data including the nozzle diameter. Da. In FIG. 19, "Da=0.4," "Da=0.5," and "Da=0.6" are nozzle diameters. The print data of FIG. 19 represent a gradual increase in the nozzle diameter Da. When the diameter of the ejection nozzle 115 is controllable, the nozzle diameter Da is recorded in correlation with the distance D in the width control information DB 2003. Accordingly, the print data creating part 25 can create print data that control the nozzle diameter Da as well as the amount of ejection of a material and the moving velocity of the ejection nozzle 115.

FIG. 20 is a schematic diagram depicting the width of the material 301 in the case where the nozzle diameter Da dynamically varies. The additive manufacturing apparatus 70 receives print data that vary the nozzle diameter Da to perform modeling while varying the nozzle diameter Da. Accordingly, the additive manufacturing apparatus 70 can vary the width of the material 301 during the modeling of a single straight line (trajectory). When the nozzle diameter Da is variable, the additive manufacturing apparatus 70 can directly control the material width to improve the modeling accuracy of a curved portion of the 3D model 500.

According to an SLA type of additive manufacturing apparatus, the irradiation width may be dynamically varied to vary the width of the material 301. For example, the positions of a light source and a lens may be changed with respect to an irradiation plane to change the irradiation width.

Other applications of the present invention are described below. All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. One or more embodiments of the present invention have been described in detail, it should be understood that the present invention is not limited to the specifically disclosed one or more embodiments and that the various changes, substitutions, and alterations could be made hereto without departing from the spirit and scope of the invention.

For example, basically, resin or metal fluid is described as a material according to this embodiment, while the additive manufacturing apparatus 70 may also eject human, animal, or plant cells to create an object. For example, the additive manufacturing apparatus 70 can create an organ or a cell sheet using cells.

Furthermore, for example, the arrangement depicted in FIG. 5 divides the information processing apparatus 20 according to principal functions to facilitate an understanding of processes of the information processing apparatus 20. Embodiments of the present invention are not limited by the manner of division or the names of processing units. Processes of the information processing apparatus 20 may be divided into a larger number of processing units in accordance with the contents of processes or may be divided so that a single processing unit includes more processes.

Furthermore, for example, the additive manufacturing apparatus 70 may include one or more of the functions of the information processing apparatus 20.

Furthermore, for example, according to this embodiment, at least one of the moving velocity of the ejection nozzle 115, the amount of supply of a material to the ejection nozzle 115, and the nozzle diameter Da of the ejection nozzle 115 is varied. Elements for controlling the material width, however, are not limited to those described above as long as the elements can dynamically vary the width of the material 301. For example, the temperature (viscosity) of the filament may be locally changed to dynamically vary the width of the material 301. According to SLA, the scanning of light irradiation may be performed in the direction of the width of the material 301 to vary the width of the material 301.

Furthermore, while the trajectory of the ejection nozzle 115 that moves back and forth inside the trajectory 304 is described as the filling trajectory 305 according to this embodiment, the filling trajectory 305 may also have a honeycomb structure.

The slicing part 24 is an example of a cross-sectional shape creating part, the print data creating part 25 is an example of a trajectory information creating part, the path width determining part 26 is an example of a width information creating part, the apparatus specifications information DB 2002 is an example of a storage part, and the ejection nozzle 115 is an example of a layering part. The process executed by the information processing apparatus 20 as described in this embodiment is an example of an information processing method.

What is claimed is:

1. An information processing apparatus configured to provide an additive manufacturing apparatus with data for creating a modeling object, the additive manufacturing apparatus including a layering part configured to layer a material and move in accordance with trajectory information to create the modeling object, the information processing apparatus comprising:
    a memory; and
    a processor coupled to the memory and configured to
        create a cross-sectional shape of the modeling object using data on a shape of the modeling object;
        create the trajectory information for layering the material in accordance with the cross-sectional shape approximated to a straight line; and
        create width information to dynamically vary a width of the material to be layered based on the trajectory information, according to a distance between the straight line and an outer edge of the cross-sectional shape, using the data on the shape of the modeling object and the trajectory information,
    wherein the outer edge of the cross-sectional shape includes a curved portion, and
    the processor is configured to create the width information to fill a gap between the straight line and the curved portion with the material.

2. The information processing apparatus as claimed in claim 1, wherein the processor is configured to
    create the trajectory information to fill in an inside of the cross-sectional shape; and
    remove an overlap between the material filling in the gap and the trajectory information to fill in the inside of the cross-sectional shape, from the trajectory information to fill in the inside of the cross-sectional shape.

3. The information processing apparatus as claimed in claim 1, wherein the processor is configured to
    create the trajectory information to fill in an inside of the cross-sectional shape;
    identify a position of the material to be layered inside the straight line in the inside of the cross-sectional shape based on the distance between the straight line and the outer edge of the cross-sectional shape; and
    create the trajectory information to fill in the inside of the cross-sectional shape without going beyond the identified position.

4. The information processing apparatus as claimed in claim 1, wherein
    the width information includes an amount of ejection of the material, and
    the processor is configured to create the width information including the amount of ejection corresponding to the distance between the straight line and the outer edge of the cross-sectional shape.

5. The information processing apparatus as claimed in claim 1, wherein
    the width information includes a moving velocity at which the layering part of the additive manufacturing apparatus moves, and
    the processor is configured to create the width information including the moving velocity corresponding to the distance between the straight line and the outer edge of the cross-sectional shape.

6. The information processing apparatus as claimed in claim 1, wherein
    the width information is information that affects the width of the material controlled by the additive manufacturing apparatus, and
    the width of the material is twice the distance between the straight line and the outer edge of the cross-sectional shape.

7. The information processing apparatus as claimed in claim 1, wherein the processor is configured to
    obtain a maximum possible width of the width information from information on specifications of the additive manufacturing apparatus stored in a storage part; and
    create the width information that does not exceed the maximum possible width.

8. A modeling system comprising:
    an additive manufacturing apparatus including a layering part configured to layer a material and move in accordance with trajectory information to create a modeling object; and an information processing apparatus configured to provide the additive manufacturing apparatus with data for creating the modeling object, the information processing apparatus including
a memory; and
a processor coupled to the memory and configured to
create a cross-sectional shape of the modeling object using data on a shape of the modeling object;
create the trajectory information for layering the material in accordance with the cross-sectional shape approximated to a straight line; and
create width information to dynamically vary a width of the material to be layered based on the trajectory information, according to a distance between the straight line and an outer edge of the cross-sectional shape, using the data on the shape of the modeling object and the trajectory information,
wherein the outer edge of the cross-sectional shape includes a curved portion, and
the processor is configured to create the width information to fill a gap between the straight line and the curved portion with the material.

9. An information processing method executed by an information processing apparatus configured to provide an additive manufacturing apparatus with data for creating a modeling object, the additive manufacturing apparatus including a layering part configured to layer a material and move in accordance with trajectory information to create the modeling object, the information processing apparatus including a memory and a processor coupled to the memory and configured to execute processes of the information processing method, the information processing method comprising:
creating a cross-sectional shape of the modeling object using data on a shape of the modeling object;
creating the trajectory information for layering the material in accordance with the cross-sectional shape approximated to a straight line; and
creating width information to dynamically vary a width of the material to be layered based on the trajectory information, according to a distance between the straight line and an outer edge of the cross-sectional shape, using the data on the shape of the modeling object and the trajectory information,
wherein the outer edge of the cross-sectional shape includes a curved portion, and
the width information is created to fill a gap between the straight line and the curved portion with the material.

* * * * *